Jan. 21, 1947.    E. H. THOMPSON    2,414,619
CHECK REGISTERING DEVICE
Filed Jan. 14, 1942    13 Sheets-Sheet 1

INVENTOR.
ERNEST H. THOMPSON
BY
Edmund W. E. Kamm
ATTORNEY

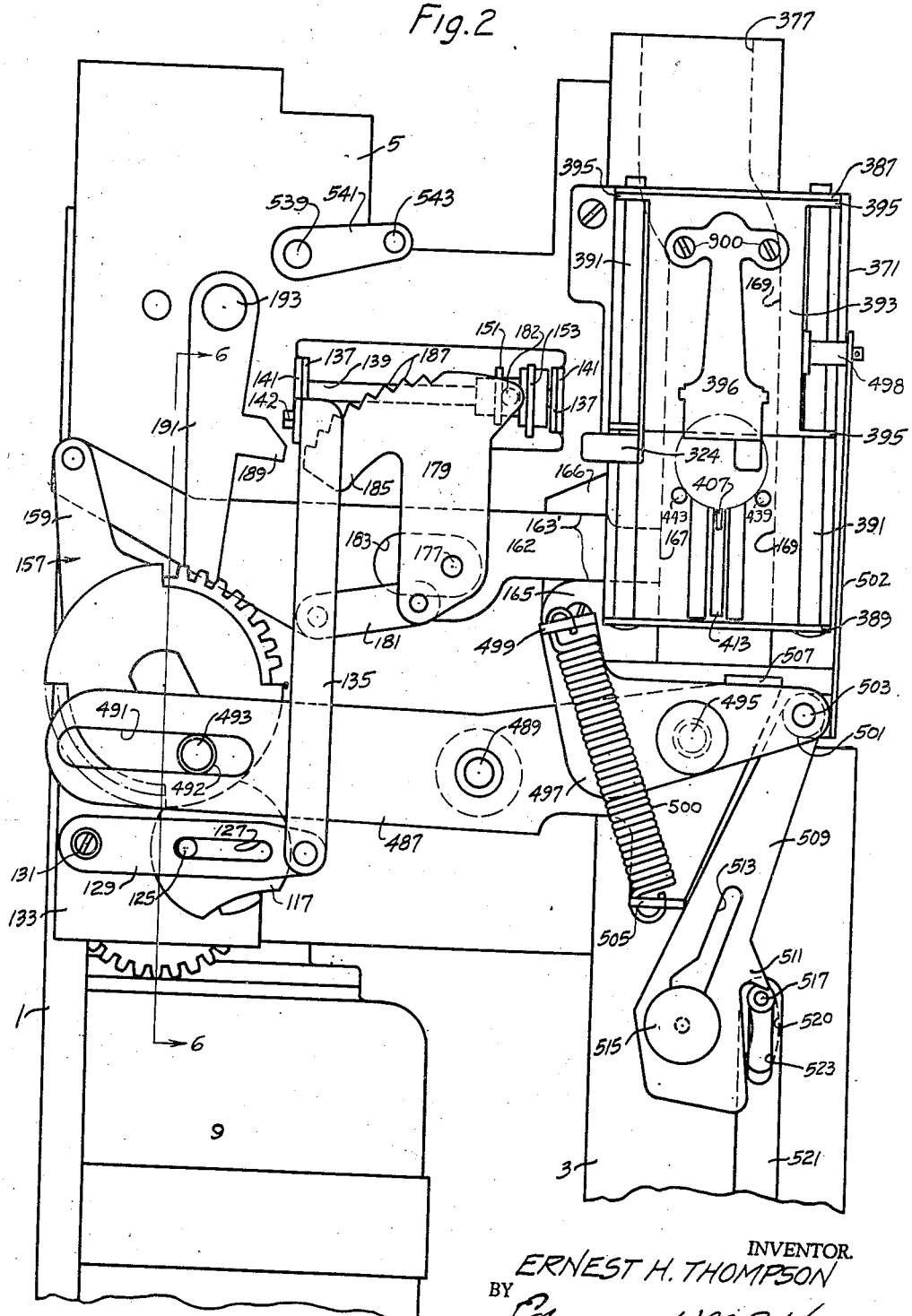

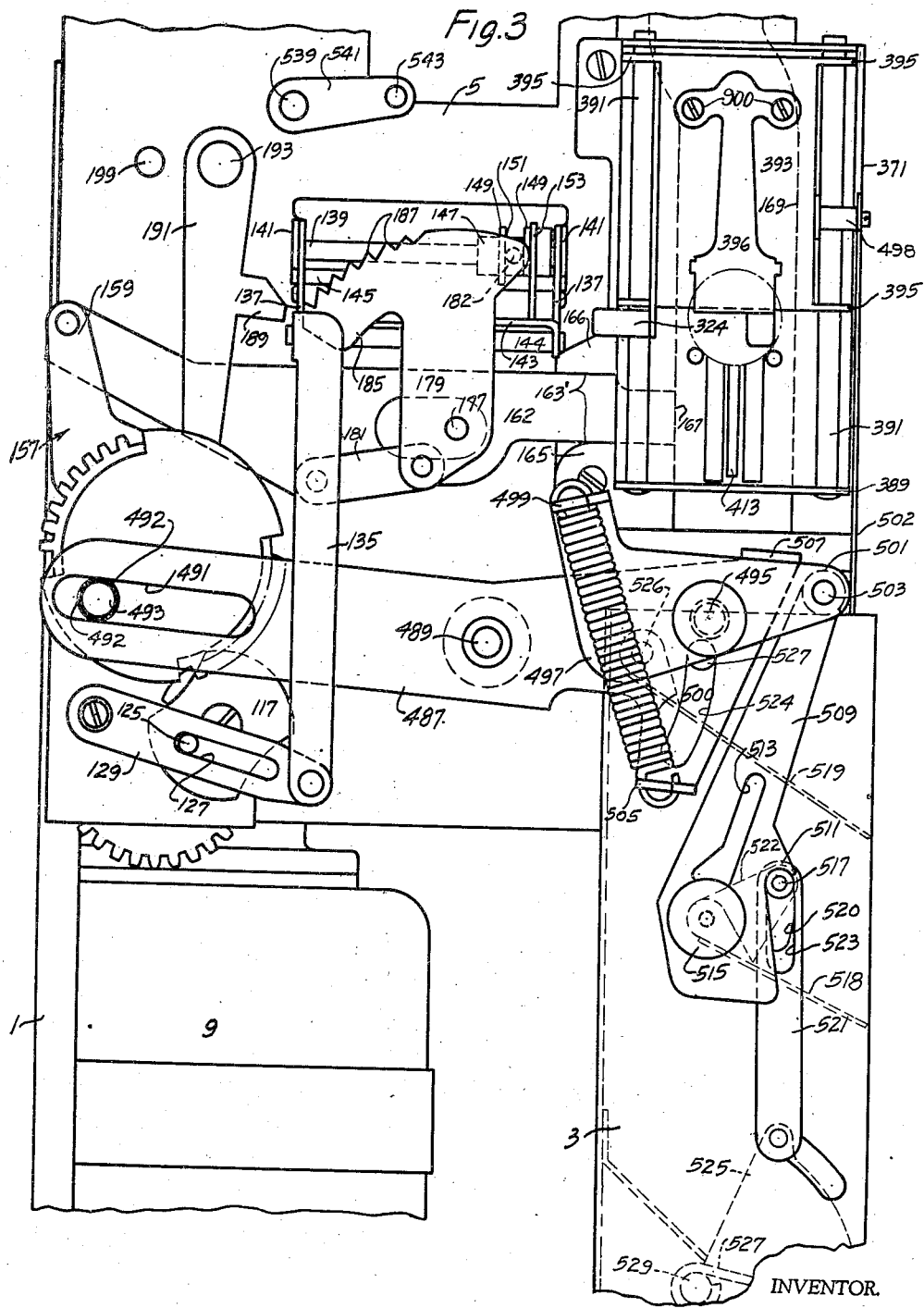

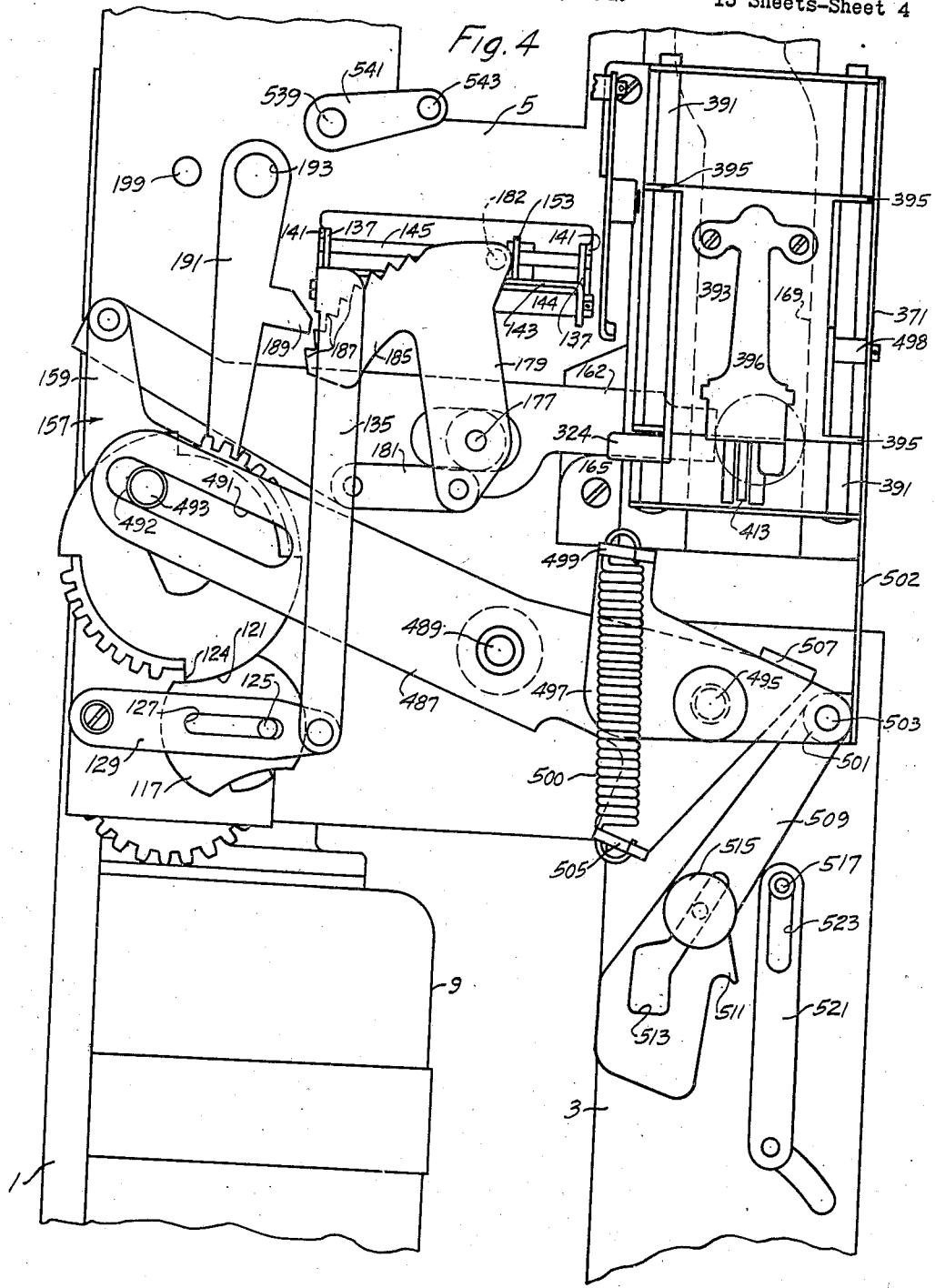

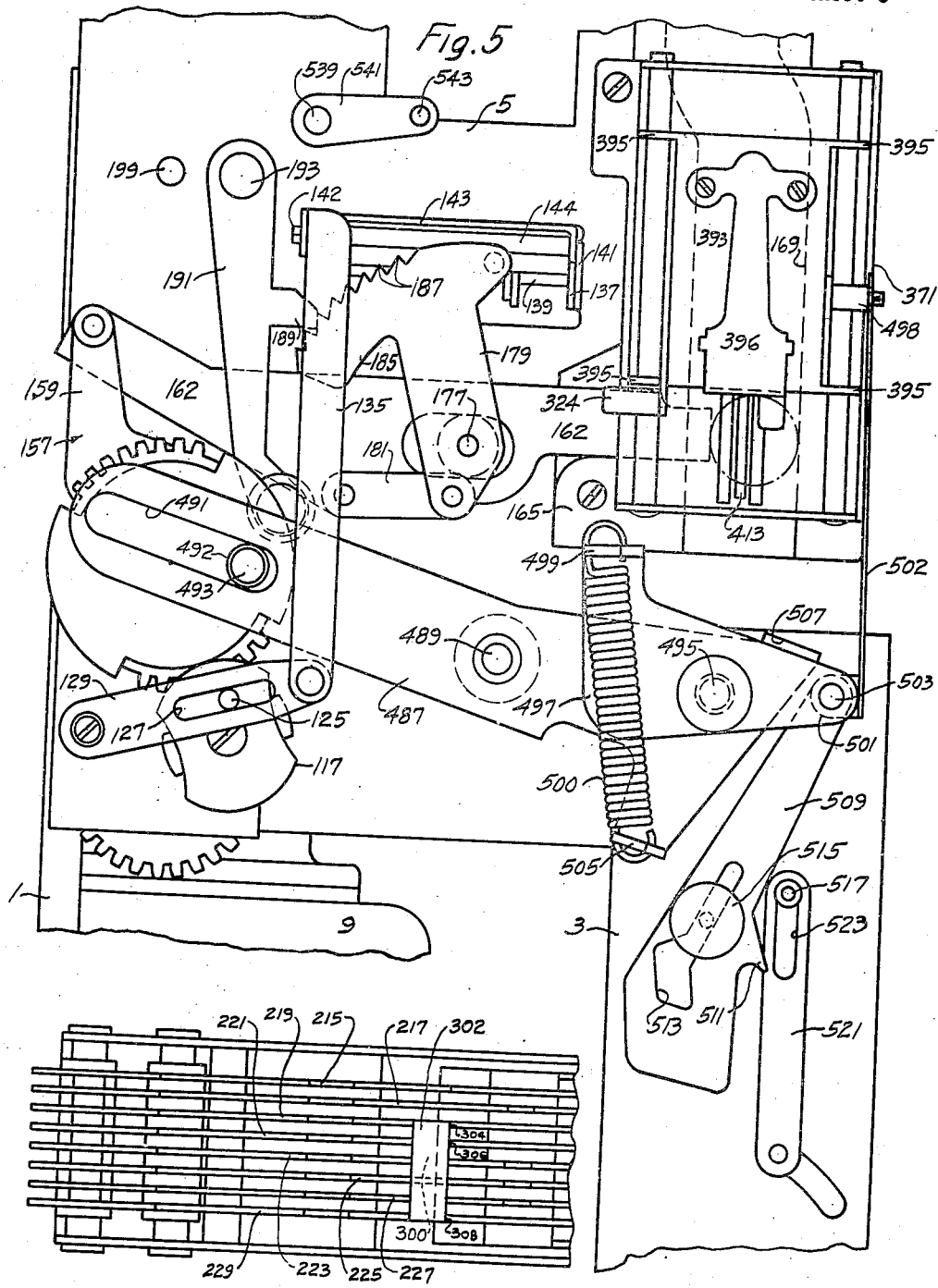

Jan. 21, 1947.  E. H. THOMPSON  2,414,619
CHECK REGISTERING DEVICE
Filed Jan. 14, 1942  13 Sheets-Sheet 6
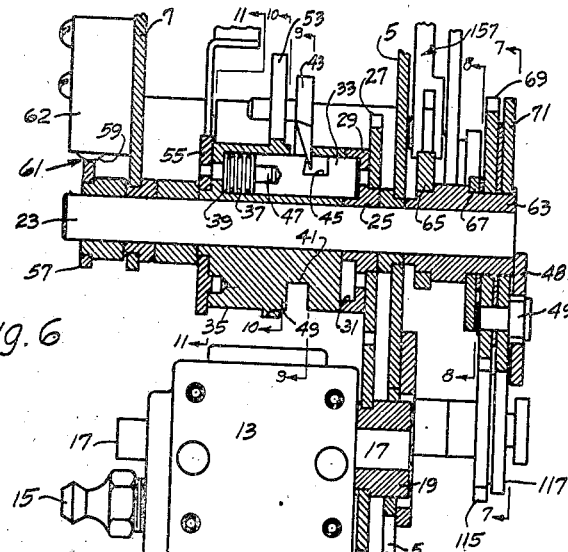
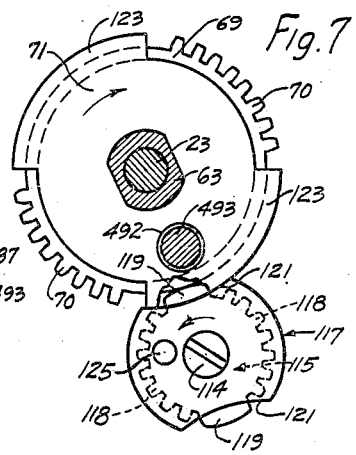
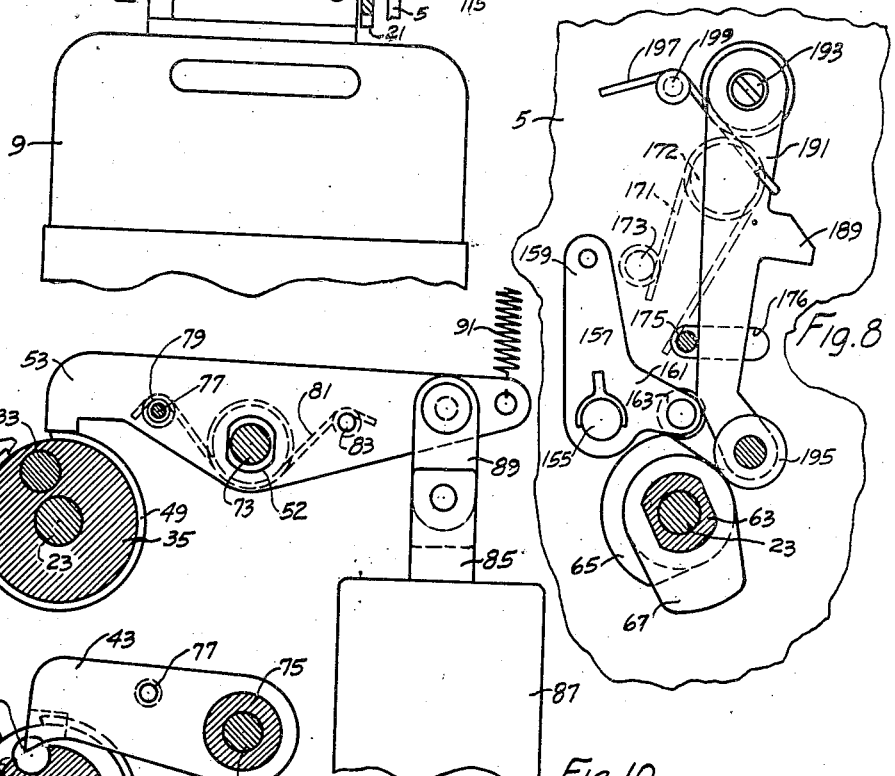
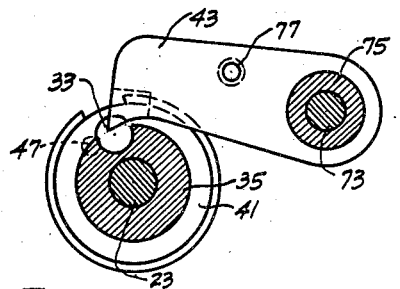
INVENTOR.
ERNEST H. THOMPSON
BY
Edmund W. E Kamm
ATTORNEY.

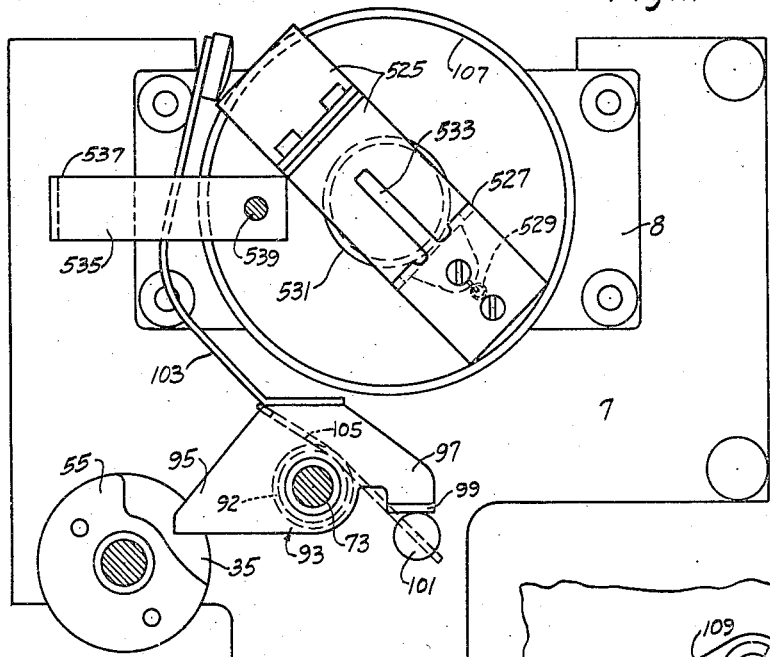
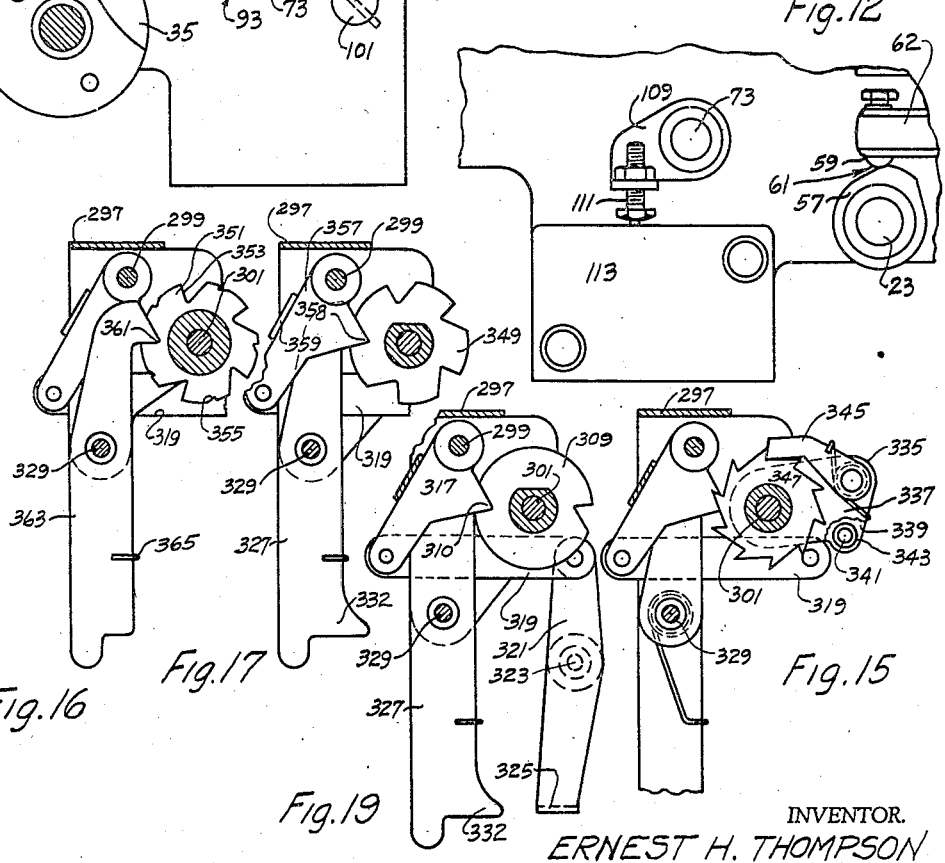

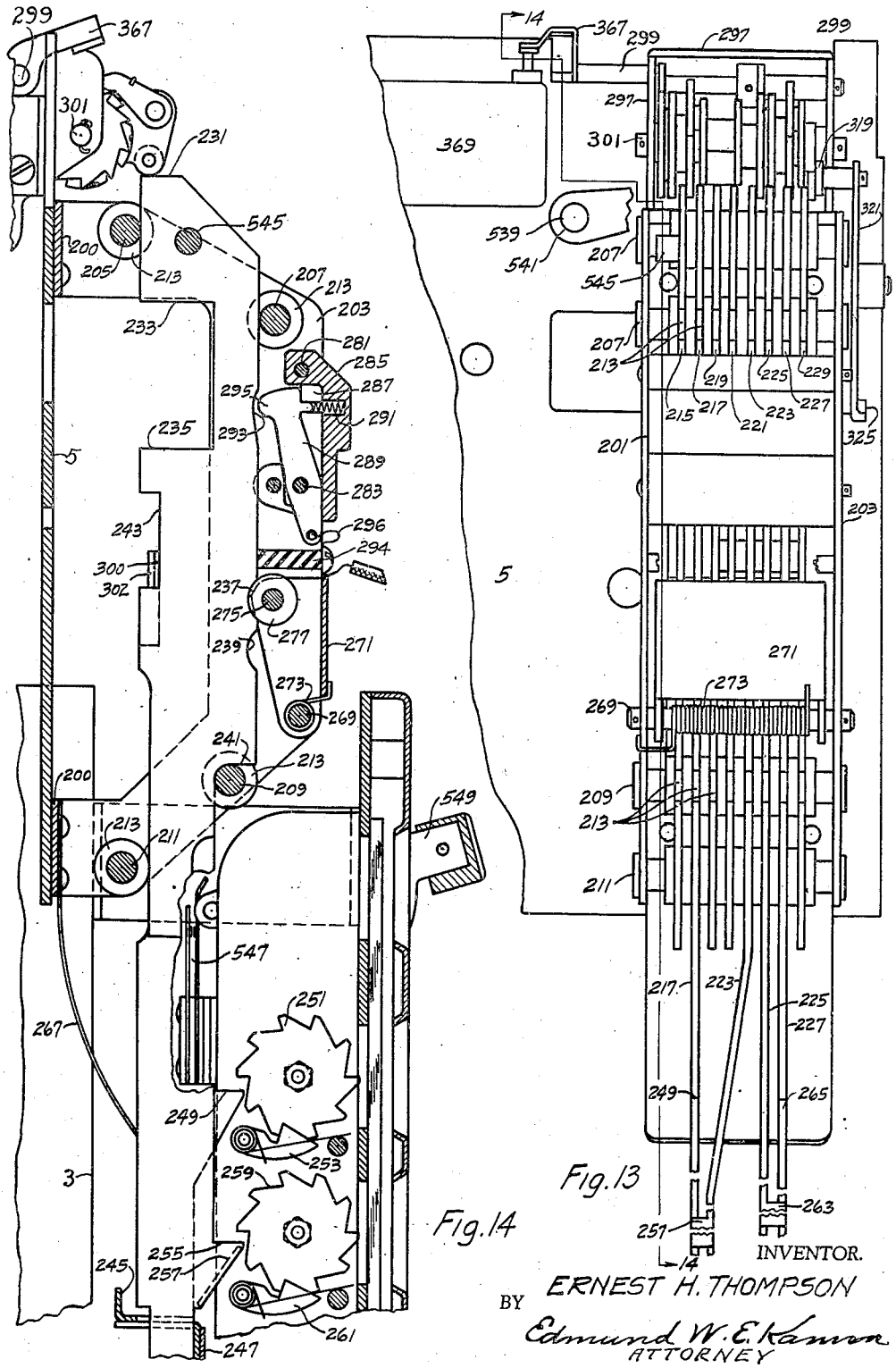

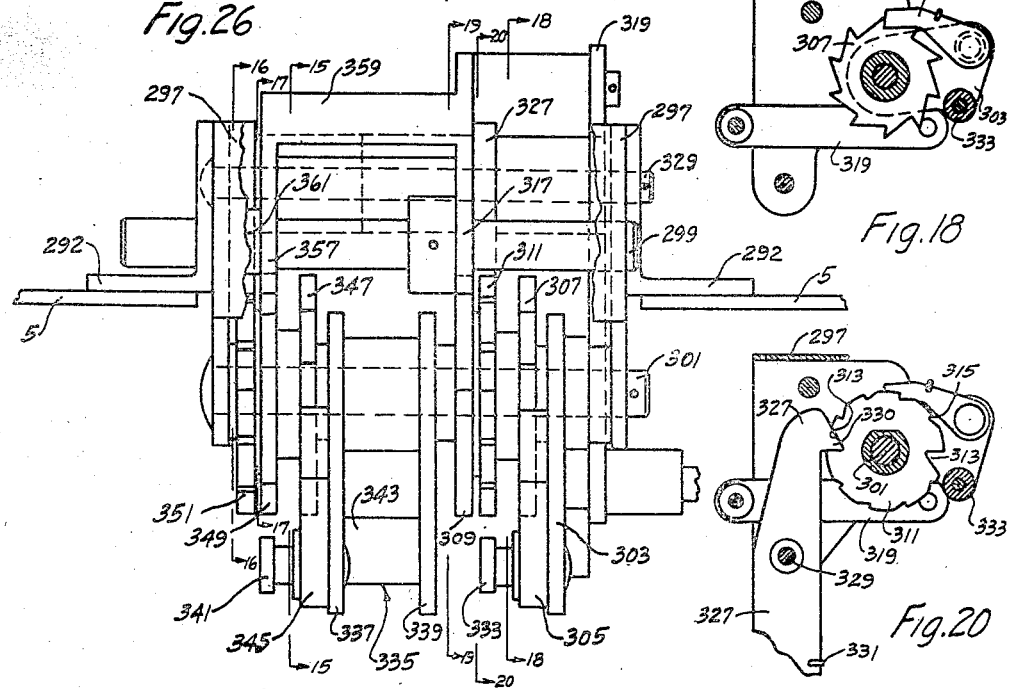
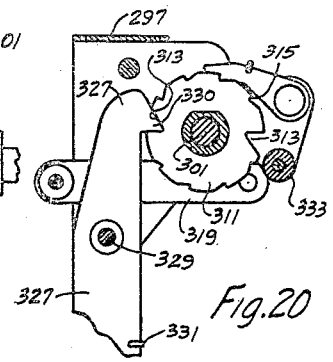
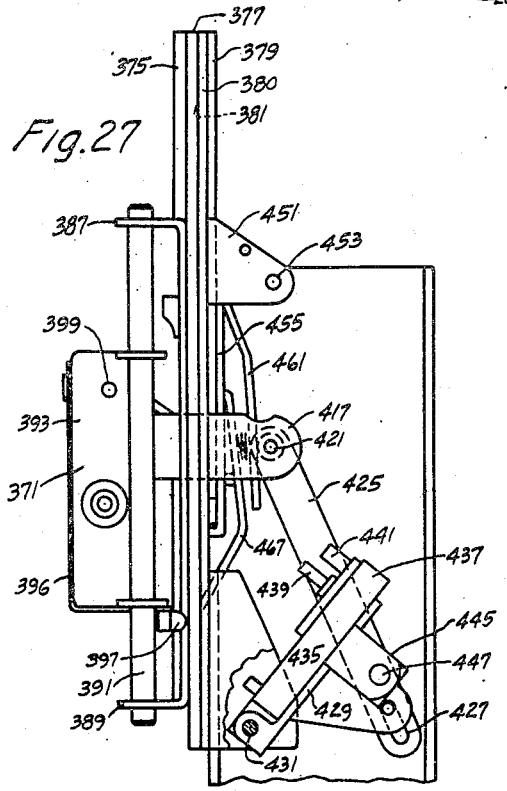
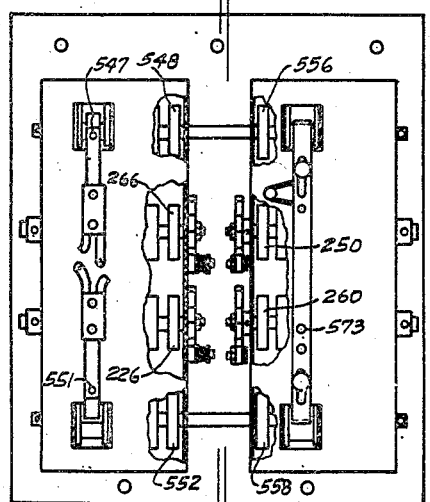

Jan. 21, 1947.  E. H. THOMPSON  2,414,619
CHECK REGISTERING DEVICE
Filed Jan. 14, 1942  13 Sheets-Sheet 10

INVENTOR.
ERNEST H. THOMPSON
BY Edmund W. E. Kamm
ATTORNEY

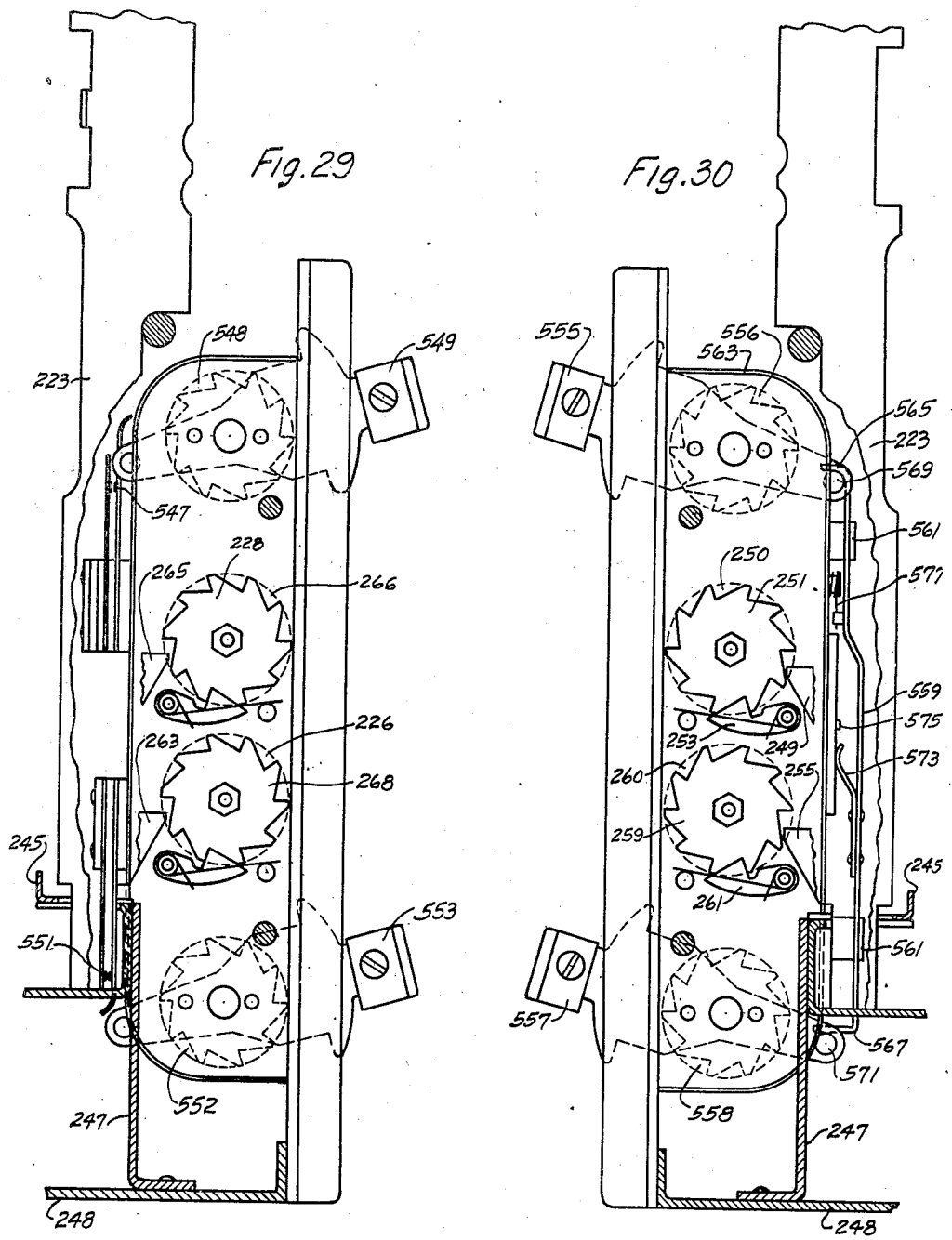

Patented Jan. 21, 1947

2,414,619

UNITED STATES PATENT OFFICE 2,414,619

CHECK REGISTERING DEVICE

Ernest H. Thompson, Winnetka, Ill., assignor to Johnson Fare Box Company, Chicago, Ill., a corporation of New York Application January 14, 1942, Serial No. 426,762

26 Claims. (Cl. 235—32)

This invention relates to a device for measuring checks, including coins, usually used in fare collection work, and includes means for registering the value of such checks upon cumulative registers and signalling the value of such checks both audibly and visually. More particularly it relates to a device which will automatically determine the value of certain of the various checks deposited and register certain ones of the different types of fares upon registers which are provided for the accumulation of such fares.

One of the objects of the invention is to provide a mechanism which will be compact and durable.

Another object of the invention is to provide a machine of the type indicated which is accurate and positive in its operation.

Yet another object of the invention is to produce a machine which is relatively simple but which will accurately select the register upon which the fare is to be accumulated.

A further object of the invention is to provide a machine of the type described in which the audible signal mechanism is controlled by the register selecting and operating mechanism to produce repeated signals.

Still another object of the invention is to provide a device which will accept the check which is deposited, measure it, to determine the register into which its value is to be accumulated, and to actuate the corresponding register.

Another object of the invention is to provide an apparatus of the type described in which the measuring mechanism is locked in position while the register actuating mechanism is functioning.

Yet another object of the invention is to provide a mechanism which will provide repeated register operations and signals where a check representing a plurality of fares is accepted.

The invention has the further object of retaining a multiple fare check in the machine while the fare registering mechanism is functioning to repeat the signals and to actuate the proper register the required number of times.

Another object of the invention is to provide a machine which automatically repeats its cycle where a multiple fare is presented.

Another object of the invention is to provide a mechanism which will prevent the clearing of the machine automatically until registration of the fare is completed.

Still another object of the invention is to provide means for interlocking the manual and the automatic signalling means so that fares may be registered by the machine and hand cyclometers individually and are also performed individually.

Yet another object of the invention is to provide means for muffling the bell to vary the audible signal in the case of certain accepted fares, such as one-half or child fares.

It is a further object of the invention to provide check handling means which will induce repeated cycling of the machine upon the acceptance of a single multiple fare check, said cycling being induced by the displacement of the handling means from its initial position.

A further object of the invention is to provide a timing mechanism which correlates the operation of the various sections of the machine so that the various required steps are performed in proper sequence.

Yet another object of the invention is to provide supplementary manually operated cyclometers which actuate suitable signal devices and upon which are registered the fares manually received or noted by the operator.

These and other objects of the invention will become apparent from a study of this specification and the drawings which are appended hereto and which form a part hereof wherein:

Figure 2 is an elevation showing the check locking and register selecting mechanism as viewed from the right of Figure 1, with the register operating mechanism removed and showing the parts in the check box returned position.

Figure 3 is a view similar to Figure 2 but with the parts in the position in which the slide bar is returned by the detent and the visible signals are cleared for a succeeding operation.

Figure 4 is a view similar to Figures 2 and 3 but with the parts in the position in which the check measuring and locking mechanism and the register selecting mechanism have been set for the check which was measured, the check in this case being a nickel.

Figure 5 is a view similar to Figures 2, 3 and 4 but with the parts in position to lock the check measuring and register selecting lever in place and with the actuating means approaching the fully actuated position.

Figure 6 is a view with parts in section, taken substantially on the line 6—6 of Figure 2.

Figure 7 is a sectional view taken on the line 7—7 of Figure 6 showing the interlocking timing mechanism.

Figure 8 is a view showing the pitman actuating and the sector locking mechanisms.

Figure 9 is a section taken on the line 9—9 of Figure 6 showing the clutch releasing means.

Figure 10 is a section taken on the line 10—10 of Figure 6 showing the means for locking the clutch in the initial or home position.

Figure 11 is a sectional view taken on the line 11—11 of Figure 6 showing the bell operating means.

Figure 12 is a detail of the control switch and its operator.

Figure 1:
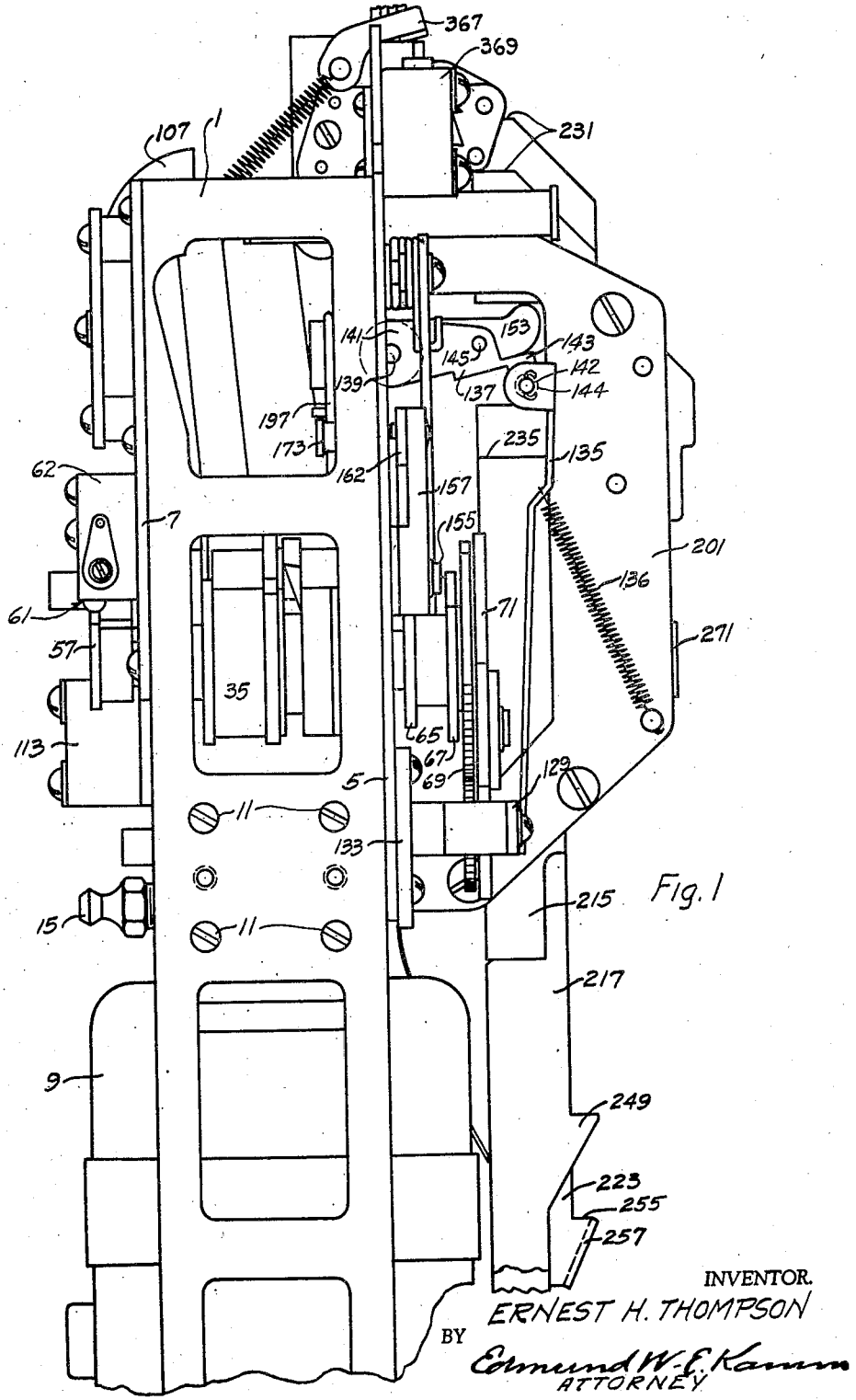
Figure 1 is an elevation showing generally, the check locking, register selecting and operating, and driving mechanisms.

slight rotation of shaft 23 brings the flange 49 under the end of lever 53 and holds switch 113 closed.

Timing mechanism

Referring now to Figures 1 to 7 and especially 6 and 7, it will be seen that a stud 114 which is fixed in frame 5 rotatably carries both a sector gear 115 which is in the plane of gear 69, and locked sector 117 which is in the plane of and cooperates with locking sector 71. Gear 115 has seven teeth in each of two diametrically opposed sections 118—118 and two opposed broad teeth 119 disposed equidistantly between the gear sections 118—118. The sector 117 has two opposed locking indentations 121—121 which coact with the locking elements 123—123 of sector 71. Sector 117 also carries a crank pin 125 which rides in a slot 127 in an arm 129 pivotally mounted on a pin 131 set in a block 133 on front plate 5 (Figs. 1 to 5). The sectors 69 and 71 (Fig. 7), pitman cam 65 (Fig. 8), the aligner cam 67, the switch cam 57 (Fig. 12), the bell cam 55 (Fig. 11), the notched flange 49 (Fig. 10), and the clutch pin 33 are all fixed to shaft 23 and since pin 125 is controlled by the sectors, the events controlled by these elements are all relatively timed.

Check measuring mechanism

Referring now to Figures 1 to 6 and 8, it will be seen that a stud 155 is set in front plate 5 and rotatably supports a lever 157 which has arms 159 and 161. Arm 161 carries a roller 163 which rides on the cam 65 described above. A pitman 162 is pivotally connected to lever arm 159 and is slidably mounted for movement laterally across the front of the plate 5. The end of the pitman which is remote from arm 159 is guided in an opening 163' formed by the spacer plates 165 and 166 (Figs. 2 and 3). This end of the pitman 167 is adapted to engage a check and force it into engagement with an anvil 169, which is one edge of the check chute 377, as will be described later. From a consideration of the cam in Figure 8 and of the Figures 2 to 5 inclusive, it will be seen that the pitman will be moved to the right under the action of a spring 171 which is supported upon a stud 172 set in the front plate 5, and one end of which bears upon an anchor pin 173 also set in the plate 5, while the other end bears upon a pin 175 which passes through slot 176 in the plate 5 and is set in the pitman. The pitman will follow the cam until the end 167 contacts a check which it forces into contact with the anvil 169, whereupon the pitman will be stopped and the follower roll 163 will leave the cam as the latter continues to rotate.

Slide bar restoring mechanism

Figure 24:
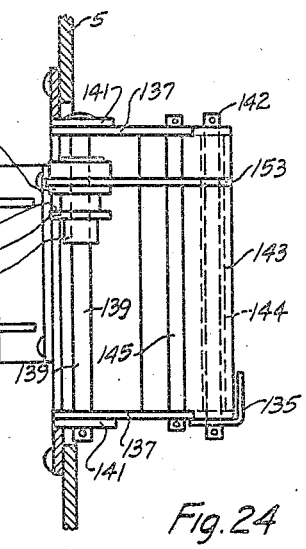

The free end of arm 129 (Figs. 2 to 5) is rotatably pinned to the lower end of a link 135 which in turn is pivotally connected at its upper end to shaft 142 mounted in a slide bar controlling bail 137 (Fig. 24). A spring 136 (Fig. 1) urges the link downwardly to take up lost motion in the linkage. The bail is rotatably mounted on a shaft 139 which is supported between projecting ears 141 fixed to the front plate 5 (see Fig. 24). The bail is provided with an outwardly projecting lip 143 which carries a shaft 142 upon which is mounted a slide bar restoring roll 144.

Mounted between the ends of the bail and above the lip is a guide shaft 145. A hub 147 is slidably mounted on shaft 139 and is provided with a pair of annular flanges 149, which form a groove 151, and with a lever 153. This lever has its outer end rounded, is fixed to the hub and is perforated to receive the shaft 145. Thus lever 153 may slide along shafts 139 and 145 but must follow the rotation of the bail about shaft 139. (See Fig. 1.)

Slide bar selector and control mechanism

Pivotally mounted upon a stud 177 set in the front plate 5 (Figs. 2 to 5), is a stop lever 179. The lower end of the lever is pivotally connected to the pitman 162 by means of a link 181. The upper end of this lever is provided with a pin 182 which enters the groove 151 formed in the hub of the selector lever 153. Thus, as the pitman 162 moves to the right as described, the stop lever 179 will rotate counter-clockwise as viewed in Figures 2 to 5 and the selector lever will assume any one of eight predetermined positions. The position assumed will depend upon the amount of motion of the pitman and this, in turn, depends upon the diameter of the check which was inserted in the machine. If no check is in the machine, the lever 153 will be positioned in the farthest left-hand position (Figs. 2 to 5). A clearance slot 183 is formed in the pitman to permit stud 177 to pass through it.

The stop lever 179 carries a sector 185 which is concentric with stud 177 and on the outer periphery of the sector are formed eight teeth 187 which are of identical outline. These teeth are adapted to be engaged by a positioning pawl 189 which is formed on a positioning lever 191. The latter lever is pivotally mounted upon a stud 193 mounted in the front plate 5. The lower end of the lever (Fig. 8) is provided with a roll 195 which is actuated by the aligner cam 67. After the stop lever 179 has been actuated by the pitman as described above, the positioning lever comes into action to take up the play in the linkage and moves the lever 179 one way or the other to accurately position the lever 153 with respect to the slide bar to be operated as described below. The teeth 187 on the stop lever and the contact face of the pawl are so formed that the line of contact of the pawl face and a tooth is substantially a vertical line. A spring 197 is mounted on the hub of the lever 191 and one end of the spring contacts a stud 199 set in the front plate 5 while the other end bears upon the lever in a direction to urge the roll 195 into contact with its cam.

Slide bar structure

In order to control the signals and actuate the register which corresponds to the check which was deposited as explained above, a slide bar arrangement shown particularly in Figures 1, 13, 14, 25, 29 and 30 is provided.

Two frame members 201, 203 are attached to the plate 5 by means of cross bars 200 (Fig. 14) integral with them, and extend outwardly at right angles therefrom. The members are fixedly spaced by four guides 205, 207, 209 and 211, each of which has eight circumferential guide grooves 213. All the corresponding grooves of the guides are substantially in the same plane.

Eight slide bars 215, 217, 219, 221, 223, 225, 227 and 229 respectively are mounted, each in one set of coplanar grooves. Each bar has a pawl actuating nose 231 although not all such noses are utilized since only bars 217, 219, 221 and 229 are associated with pawls. Each bar is provided with a surface 233 (Fig. 14) which is adapted to be contacted by lever 153 (Fig. 1) when the latter is positioned under such surface. Each bar also has a lower surface 235 which is contacted by a roll 144 which is mounted on a shaft 142 to which link 135 is pivoted and lies below the lip 143 of the bail 137 so that the bar, if it is raised by lever 153, will be subsequently restored by the roll 144.

Each bar is provided with a pair of detent notches 237 and 239 on its outer edge and with a stop shoulder 241. A clearance notch 243 is also provided in each bar.

The bars 215, 219, 221 and 229 terminate at a point slightly below the spacer 211 while the other bars extend beyond the short bars and are guided in a comb plate 245 which is mounted on a bracket 247 mounted on the base plate 248 (Figs. 29 and 30).

The bar 223 is bent laterally as shown in Figure 13 so that it lies adjacent bar 217. Bar 217 is provided with a tooth 249 which is adapted to engage a ratchet 251 of a register 250. A spring pressed detent pawl 253 also engages the ratchet to hold it against reverse rotation. Bar 223 carries a tooth 257 which lies over bar 217 and which engages a ratchet 259 connected to operate a second register 260. A holding pawl 261 is associated with this ratchet. Bar 225 is provided with a tooth 263 which overlies bar 227 and actuates register 226, through ratchet 268, while bar 227 is provided with a tooth 265 which actuates the register 266 through ratchet 228.

As shown in Figure 14, a leaf spring 267 is mounted on lower cross bar 200 and extends downwardly and outwardly into contact with the lower ends of the long bars and urges them toward their respective ratchets.

A pivot rod 269 is mounted between the members 201, 203 and a bail 271 is pivotally mounted thereon. A spring 273 is coiled about the rod and urges the bail in a counter-clockwise direction (Fig. 14). A shaft 275 is carried by the bail and a detent roll 277 is mounted thereon for coaction with the notches 237 and 239 described above. The detent roll serves to hold the slide bars either in the home or in the actuated position.

As shown in Figure 25, the bar 225 is provided with an ear 300 to which is fixed a transversely extending bar 302 which overlies, on one side, the bars 219, 221 and 223 and on the other side, the bars 227 and 229. The bars 219, 221 and 229 are provided with lower shoulders 304, 306 and 308 respectively which are disposed just below the bar 302. Thus when any one of the slide bars 219, 221 or 229 is actuated, the bar 302 will be picked up by the shoulder of the actuated bar, and the slide bar 225 will also be actuated. It will be noted that bars 219, 221 and 229 are short bars and are not separately connected with a register. Bar 225 is connected to register 226 as described above, hence the fares which cause actuations of any of the bars 219, 221, 225 or 229, which are the dime, penny, nickel and quarter bars respectively, are all accumulated in register 226.

The bars 219, 221 and 229 are cut away above the shoulders to provide clearance for the transverse bar and the bars 223 and 227 are cut away both above and below the transverse bar so that the bars and the transverse bar may be operated independently without affecting each other. As was pointed out above, the bars 217, 223 and 227 are connected respectively to registers 250, 260 and 266, which are the .650 token, .800 token and .900 token registers. The bar 215 operates only when no check is in the machine.

Mounted between the frame members 201, 203 on rods 281 and 283 is an insulator unit 285 (Fig. 14) which carries in pockets 287 a series of contact members 289 which are mounted upon rod 283. The contacts are urged outwardly toward the slide bars by springs 291. The lower ends of the members contact the lower edge of the insulator to determine the extent of the counter-clockwise rotation of the members. The slide bars are each provided with a notch 293 adjacent the nose 295 of the associated pawl so that there will be no contact made when the bars are in the home position. The contacts are connected to wires 296 at their lower ends which lead to an insulator 294 having binding posts from which run leads to equipment which will be later described. One contact is provided for each of the four bars 217, 223, 225 and 227.

*Repeat ring mechanism*

Mounted above the upper ends of the slide bars is a mechanism which is adapted to cause repeated cycling of the machine and, consequently, a series of actuations of the bell hammer 103, other signals and the registers to indicate certain fares. In the instant case, the machine normally makes a single cycle upon deposit of a basic fare which is a nickel or equivalent check, but when one section of the repeat ring mechanism is actuated, it will cause two cycles to occur while the other section of the repeat ring mechanism will cause five cycles to occur. However, the machine can readily be designed to produce other multiple rings if desired.

This mechanism will be better understood if Figures 13, 14 to 20 and 26 are referred to. A bail 297 is fixed to the front plate 5 by brackets 292 (Fig. 26) and this bail supports shafts 299 and 301. As shown in Figure 18, a pawl carrier 303 is mounted for rotation about shaft 301 and carries a pawl 305 which is spring urged into engagement with a ten-tooth ratchet 307, mounted for rotation on the same shaft. Connected to the hub of this ratchet is a two-tooth ratchet 309 (Fig. 19) and a ratchet 311 (Fig. 20) which has two deep notches 313 spaced 180 degrees and eight notches 315 which are equidistantly spaced between the deep notches of the ratchet making it, in effect, a ten-tooth ratchet.

A pawl 317 (Fig. 19) is fixedly mounted upon the shaft 299, is spring urged toward the two-tooth ratchet 309 and has a tooth 310 for engaging the ratchet. The lower end of the pawl carries a link 319 which is pivoted to the upper end of a lever 321. The latter is pivoted on the frame at 323 and at its lower end carries a stop 325.

A lever 327 is pivoted on shaft 329 supported by the bail 297 and at its upper end is provided with a pawl tooth 330 which is urged into contact with ratchet 311 by spring 331. This pawl is provided with a projection 332 at its lower end which is adapted to enter the groove 151 (Fig. 24) when the tooth 330 rides out of the deep notches 313 of ratchet 311. A roll 333 is mounted on the pawl carrier 303 and is adapted to be engaged by the slide bar 229. Each time the bar is actuated, the pawl 305 will advance its ratchet 307 and, consequently, the ratchets 309 and 311 one step. Upon the first step, the pawl 310 will be cammed in a clockwise direction (Fig. 19) and through link 319 will rotate lever 321 in a counter-clockwise direction for a purpose to be described. The ratchet 311 cams pawl nose 330 outwardly forcing projection 332 into groove 151 to hold the lever 153 in position. This constitutes the five-ring section.

A second pawl carrier 335, which comprises two plates 337 and 339 held together by a pin 341 and a spacer 343, is mounted for rotation on shaft 301. A pawl 345 is pivoted on the carrier and urged into engagement with a ten-tooth ratchet 347. Mounted in order on the hub of the ratchet is a five-tooth ratchet 349 and a ten-tooth ratchet 351 which has five deep notches 353 and alternate shallow notches 355. A pawl 357 is fixedly mounted on shaft 299 and is provided with a tooth 358 which is adapted to engage the notches in ratchet 349. This pawl is joined to the pawl 317 by a bar 359 which is integral with both. Thus both pawls move in unison and pawl 357 will actuate the lever 321 in the same manner as the pawl 317. A nose 361 is formed on lever 363 which is mounted loosely on shaft 329 and is urged into contact with both sets of notches in the ratchet 351 by spring 365 and acts as a holding pawl for this ratchet. This constitutes the two-ring section.

It will thus be seen that as either pawl 317 or 357 is cammed out of the associated ratchet, the shaft 299 will be rotated in a clockwise direction (Figs. 16 to 20) and the lever 367 shown in Figures 13 and 14, which is fixed to the shaft (Fig. 14), will be depressed to close the switch 369. This switch maintains the operating circuit of the machine closed so that the machine will continue to go through the plurality of cycles dictated by the repeat ring mechanism, since the coin gap is open after the first cycle. It will stop only when the pawl 317 or 357 which has been cammed out seats itself in the succeeding deep notch in its ratchet. In the case of ratchet 309, the machine will make five cycles and in the case of ratchet 349, two cycles. At the conclusion of the cycling of the machine and at the time the pawl 317 or pawl 357 (whichever was active) seats itself in the deep notch so as to release lever 367, the switch will be again opened, the stop 325 will be withdrawn from the path of an abutment 324 on the check holder or box and the actuating check will be ejected. The bar 229 is the only one which actuates the pawl 305 while each of the bars 217, 219 and 221 actuate the pawl 345.

In the case of the five-ring mechanism, nose 332 on lever 327 engages in groove 151 and maintains the lifting lever in alignment with the bar 229 until the five cycles are complete, even should the check be accidentally discharged.

*The check handling mechanism*

Figure 21:
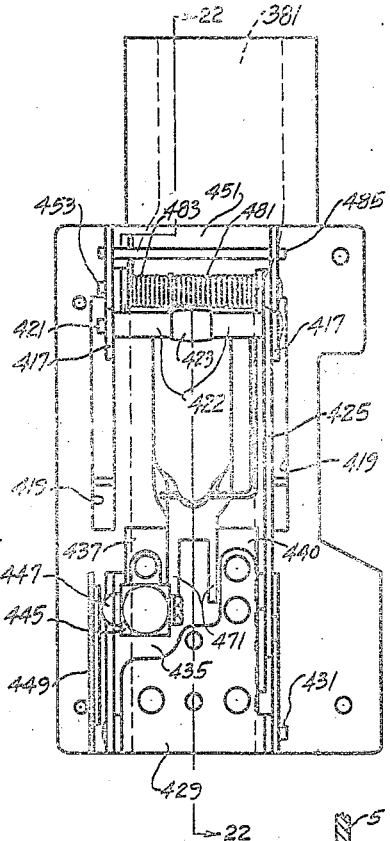
Figure 23:
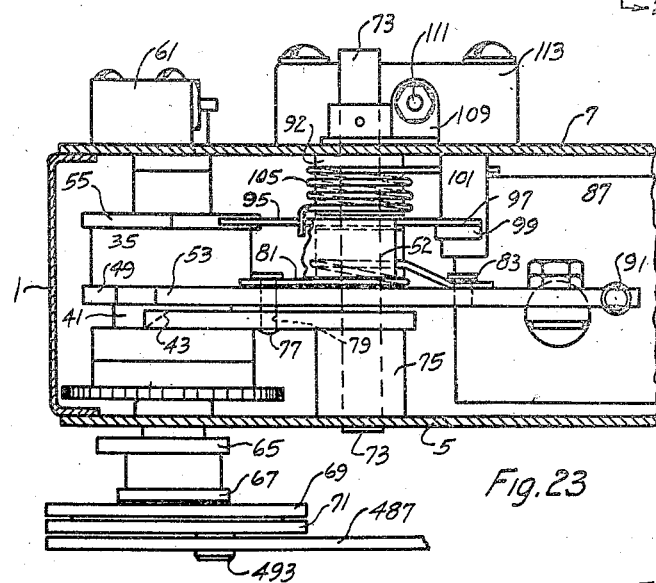
Figure 22:
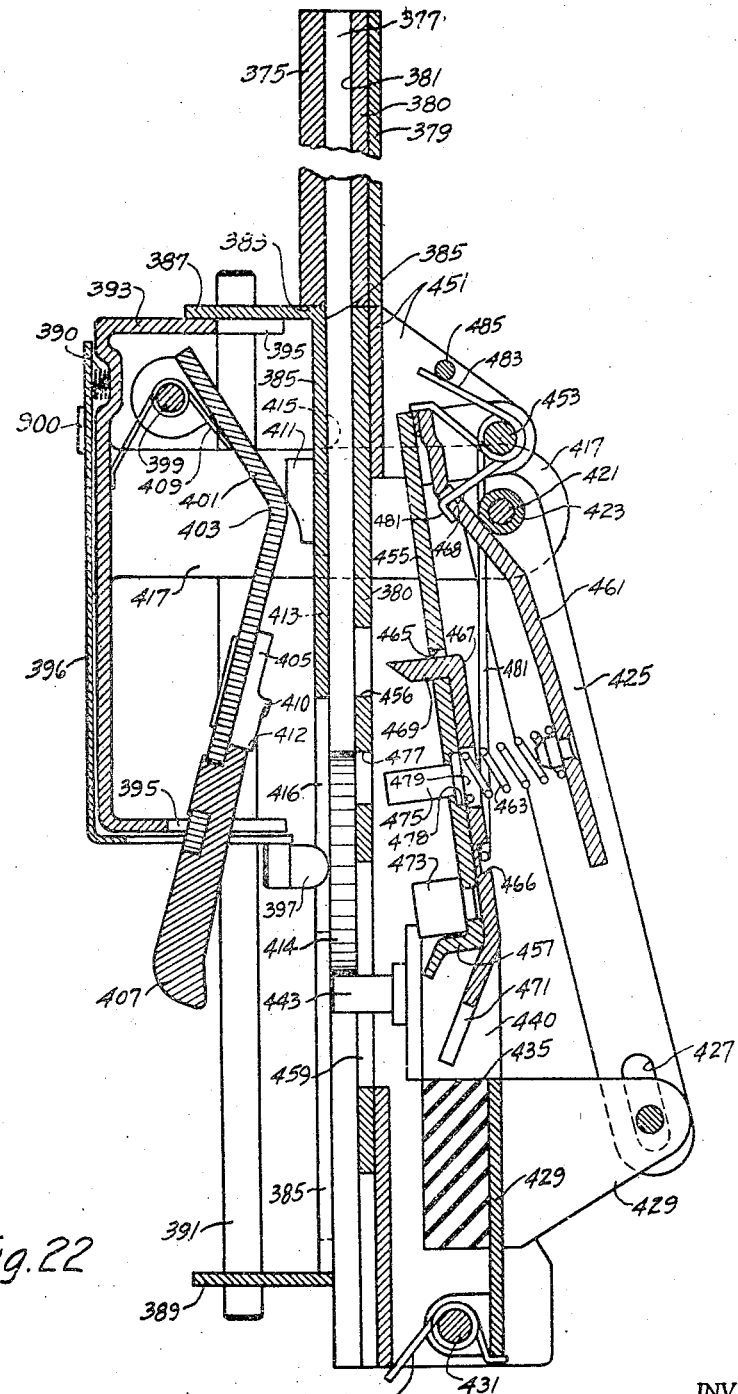

The check handling mechanism is shown generally by numeral 371 in Figures 2 to 5 and in detail in Figures 21, 22 and 27. This structure is substantially the same as that shown in my Patent Number 1,896,649 issued February 7, 1933. A check chute is formed by laminations 375, 377, 379 and 380 of which 377 is cut away to form a passage 381. The chute laminations are suitably attached to the front plate 5. The element 375 is cut away at 383 and a bracket 385 is inserted which has upper and lower transverse flanges 387 and 389. Joining these flanges are vertical guide rods 391 upon which is mounted a slidable check control box 393 by means of ears 395 which are perforated to receive the rods.

Mounted on the exterior of the box (Fig. 22) is a flexible contact carrier 396 which is bent over the lower corner thereof and carries a contact point 397 and which is urged to the right by spring 390 acting on the part of the carrier 396 which extends above the mounting screws 800. Passing through the box is a shaft 399 upon which is pivoted a lever 401 by a pair of spaced ears. This lever is bent as at 403 and carries a check pick-up or pusher pawl 405 and a finger 407. A spring 409 urges the lever in a counter-clockwise direction about the shaft and a cam lug 411 fixed on plate 385 cams the lever in the opposite direction as the box rises. The pick-up pawl has check engaging projections 410, 412 which ride in slots 413 in plate 385 above the check 414 deposited in the chute and the finger 407 enters the slot 416 below the check.

Figure 32:
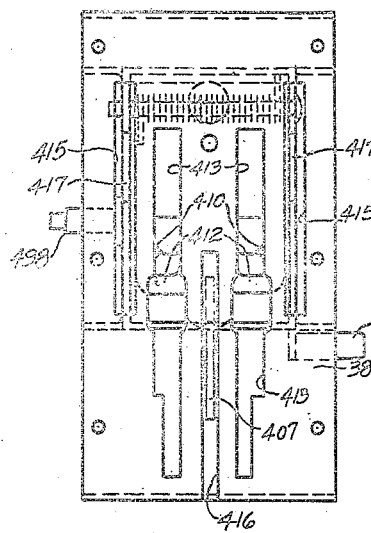

The plate 385 is slotted at 415 (Fig. 32) on both sides of slots 413 and the box carries a pair of arms 417 which project through these slots and aligned slots 419 in plates 377 and 389. A shaft 421 connects the arms and a roll 423 is supported on the shaft and positioned centrally by spacers 422. A link 425 is pivoted on the right end of the shaft (Fig. 21) and has a slot 427 at its lower end which receives a pin carried by an angle plate 429.

The angle plate 429 is pivotally supported on a shaft 431 and is urged counter-clockwise by a spring 433. The plate carries a block of insulating material 435 which is formed with a pair of upstanding projections 437 and 440. On the left-hand projection 437 (Fig. 21) is mounted a long and a short contact 439, 441 (Fig. 27) which are electrically connected, while the right-hand projection 440 is provided with a single long contact 443 (Fig. 22) which is insulated from the other contacts but is grounded to the frame through plate 429. The plate 429 is cut away in the region of 437 and a post 445 which is connected with the contacts 439, 441 is mounted on the rear of block 435 and carries a laterally directed spring contact 447 which is adapted to slidably engage a contact plate 449.

Mounted on lamination 380, below the lamination 379, is a bail 451 which carries a shaft 453. A lever 455 is mounted for rotation on this shaft by means of suitable ears and carries an inwardly projecting pawl 457 at its lower end. The tip of the pawl is adapted to enter an opening 459 in plate 380 between the projections 437 and 440. A second lever 461 is also rotatably mounted by means of ears on the shaft 453 and its lower end supports a coil spring 463. A slot 465 is formed in lever 455 and a plate 467 has a hook 469 formed on the upper end which passes through the slot 465 and enters the check chute through a slot 456 in plate 380. The outer end of the hook is bevelled upwardly as shown in Figure 22. The lower forked end 471 of the plate is narrowed so as to enter the space between projections 437, 440 and is bent slightly inwardly. This plate is held in place by spring 481 described below. A pin 473 is set in lever 455 and enters slot 459 of plate 380 between the projections 437 and 440. A relatively long, headed pin 475 projects through lever 455 and is adapted to enter a hole 477 in plate 380. The head of the pin sets in a recess 478 in 455. The spring 463 engages the head of the pin 475 through a hole 479 in plate 467.

A relatively strong spring 481 is mounted on shaft 453 so that one end engages a groove 466 in plate 467 so as to hold it in place on the lever while the other end of the spring engages a shoulder 468 near the upper end of lever 461. This spring tends to "spread" the levers 455 and 461. A relatively weak spring 483 is also coiled about shaft 453 and one end is hooked over the upper edge of lever 461 and the other end bears against a fixed rod 485. This spring returns the levers 455 and 461 to the Figure 22 position when the roll 423 moves to its upper position. The upper end of 461 rests against the upper end of 455 to limit the relative rotation of these levers under the action of spring 481.

The deposited check will rest upon the long contacts 439 and 443 which block the chute and will close a circuit, which will be later described, to start the cycle which will cause the check control mechanism to be drawn downwardly. A circuit parallel to that of the coin gap, formed by contacts 439 and 443, is provided through the short contact 441, the check and the contact 397, which is urged against the check by spring 390 and which in turn urges the check into contact with 441. Thus a circuit will be surely established through one or both sets of contacts upon deposit of a check. As the check control box 393 is drawn downwardly the shafts 399 and 421 together with lever 401 and link 425 will move downward. As soon as lever 401 leaves cam 411, it will be rotated by spring 399 to position the check pick-up fingers 410 and 412 in slots 413 above the check 414 and the finger 407 in the slot 416 below the check. No movement of plate 429 is effected because of the lost motion slot 427 in the link which is just taken up in the movement described.

The roll 423 will, during the same period, press lever 461 in a clockwise direction against the action of spring 481, and spring 481 will transmit the motion to lever 455 so that the hook 469 on plate 467, the pin 475, the pawl 457, pin 473 and the bent end 471 of the plate will all enter the openings provided for them in plate 380.

The pin 473 will engage the check which is to be registered and will yieldably hold it in contact with the bracket 385 in position to be engaged by the pick-up projections 410 or 412 depending on the diameter of the check. The pin 475 yieldably engages any check in the chute which may rest on the upper edge of the actuating check so that the uppermost check will not follow the actuating check and the pick-up pawl in their downward travel. The hook 469 enters the chute to support any checks which may be inserted after its entry into the coin chute.

Substantially at the same time that pick-up pawls enter the slots 413, the lost motion of the link slot 427 is taken up and the plate 429 and contacts 443, 439 will be rotated clockwise (Fig. 22) to withdraw the contacts from underneath the check, and thereafter the check is pushed downwardly by the pick-up or pusher pawl. During this operation the check is moved out from underneath pawl 457 but is immediately engaged and yieldably pressed against the side wall of the chute by the lower end 471 of plate 467. The check is thus positioned between the pitman 167 and the anvil 169 for the measuring operation. The pawl 457 has the same function as pin 473 described above and, additionally, engages the upper edge of the check to prevent it from being dragged upwardly upon the return stroke of the check pusher.

The steps 410, 412 on the check pusher have less depth than the thickness of the thinnest check encountered in practice of the invention. The end 471 of plate 467, when it is positioned in the check chute, performs the function of holding the check flat against plate 385 at the measuring station and the additional function of holding back one of two checks which may be in the chute in face to face relation while the pusher shears off and forwards to the measuring station the check which is immediately adjacent it so that both checks will be ultimately registered individually and no two checks will occupy the measuring station at the same time.

During the upward stroke of the box, the events occur in the reverse order. The contacts 439, 443 are again positioned to receive another check and the pin 475 and hook 469 are withdrawn from the chute to permit the passage of another check to the contacts.

When a check is held at the measuring station for a repeat operation, the finger 407 will rest upon this check and will prevent the pick-up pawl from entering the check chute a distance sufficient to engage another check which may be held in pick-up position by the pin 475. Thus no additional check will be forced toward the measuring station while it is occupied by a check.

As the contacts 439, 443 approach the fully rotated position, the sliding contact 447 will pass out of contact with the contact plate 449. A holding circuit is established by switch 13 (Fig. 6) as soon as the solenoid 87 is energized by a circuit through the coin gap and the machine will continue to operate.

In the event it is necessary to produce a plurality of cycles of the machine to repeat the bell, signal and registration operations as described in connection with the repeat ring mechanism, the check is held at the lowermost level and as an abutment 324 which is attached to the lower left side (Figs. 2 to 5) of the check box 393 rises to the stop 325 (Fig. 19), the switch 369 which is closed by the repeat ring mechanism will take the place of a coin in the coin gap and the cycle will be repeated. When the abutment 324 and stop 325 are in engagement, the check box is prevented from reaching the point in its travel at which the lever 401 contacts cam 411 or the roll 423 releases the pressure on lever 461; consequently, the check which was last calipered will not be ejected and the next adjacent check will be prevented from entering the calipering position. The check will not be ejected until the box rises above the level of the stop and the lever 471 releases the check.

*Check control box operating mechanism*

Referring now to Figures 2 to 5, the lever 487 is pivotally mounted at 489 on the front plate 5. The left end of the lever is provided with a slot 491 which embraces a roller 492 carried on a pin 493 set in the gear 69 and sector 71. The pin makes one revolution per cycle and it is continuous since it is directly connected with the clutch.

The right-hand end of the lever carries a pin 495 on which is pivotally mounted a bell crank 497, one arm of which is provided with an ear 499 which supports one end of a strong tension spring 500. The other arm 501 is provided with a pin 503 which connects it to one end of a drag link 502. The other end of said link is connected to a stud 498 on the check control box 393. An ear 505, formed on lever 487, supports the other end of the spring and a second ear 507 formed on the lever stops the upper edge of bell crank 497 and limits the rotation of the bell crank induced by the spring.

The pin 503 also carries a pitman 509 which, at its lower end, is provided with a hook 511 and a cam slot 513. A shaft 515 having a large head passes through the slot and enters the frame channel 3. A pin 517 which is attached to a check supporting shelf 518 by an ear 522, shown in dotted lines in Figure 3, projects through a slot 520 in the frame. The shelf is pivoted on the shaft 515 and is urged upwardly by a spring, not shown.

A link 521 is connected with pin 517 by a slot 523 and at its lower end is connected to an ear 525 on a door 527 which closes the channel 3 and which is pivoted at 529 (Fig. 3). The door 527 is operable from the exterior of the case, and as the door 527 is rotated in a clockwise direction the link 521 will be drawn down. This connection thus enables the operator to manually unload the shelf 518.

The upper shelf 519 (Fig. 3) is pivotally mounted in the channel at 526 and is urged counterclockwise by a spring, not shown. A pin 527 set in lever 487 enters a curved slot 524 in channel 3 and engages the upper surface of the shelf to depress it as the lever moves downwardly. The pin 527 engages the shelf after the shelf 518 has been dumped and returned so that the last two checks received will always be displayed to the operator who may, at will, dump the lowermost check only, as described above.

It will be seen that as the pin 493 is revolved by the clutch mechanism, the lever 487 will be oscillated through a complete cycle to lower the check box and return it, causing the coin box mechanism to pass through its cycle of operation. Depression of the pitman 509 will cause the hook 511 to engage pin 517 and operate the check shelf 518 so as to dump the check on it down onto the door or bottom of the check receptacle 527.

At a point in the downward movement of the pitman, the edge of the cam slot engages the pin 515 and cams the lever 509 in a clockwise direction so that the hook 511 is released from the pin 517 and the shelf is returned by its spring, so that it will be in position to receive the next check when it is dropped from the upper shelf 519.

In the event the repeat mechanism blocks the complete return of the box 393 to its normal position, the drag link 502 will be stopped, the lever 487 will return to its initial position and, as it does so, the bell crank 497 will rotate, stressing spring 500. Thus a full stroke of lever 487 will be permitted even though the check box does not complete its stroke. Even when the box does return to its uppermost position, there will be some lost motion in the bell crank.

Bell muffle

The bell 107 (Fig. 11) is provided with an electric muffle which comprises a muffling member 525 fulcrumed in a slot in the standard 527 mounted by a stud, not shown, on the plate 8 and thus on the plate 7. The member 525 is held out of contact with the bell by a spring 529 and is actuated by an electromagnet 531. The member 525 forms the armature of the magnet. A stop 533 limits the movement of the member away from the bell.

Shown also in Figure 11 is a lever 535 which has a bent up end 537 and which is mounted for rotation with a shaft 539 which passes through the front plate 5 and has fixed to it a lever 541 (Figs. 2 to 5 and 14) which extends toward the slide bar 215 and carries a pin 543 in the path of a stud 545 on the bar. Thus when the bell hammer 103 is cocked and the slide bar 215 rises, the shaft 539 will be turned counterclockwise to position the end 537 in front of the hammer and prevent it from falling on the bell. Thus no audible signal is given when the mechanism is operated without the insertion of a check as when it is operated to discharge the checks on the inspection shelves.

Hand cyclometers

In addition to the four mechanically operated cyclometers (see Figs. 14, 28, 29 and 30), there are four hand-operated cyclometers 548, 552, 556, 558 which may be of any desired construction. Preferably, cyclometer 548 registers child fares; 552 registers passes; 556 registers tickets and 558 registers transfers, although they may be used to designate any other type of manually collected fare. These also operate visible signals and for this purpose the cyclometer 548, shown in Figures 14 and 29, is provided with a switch 547 which is actuated by the end of the cyclometer operating lever 549. A second cyclometer 552 shown generally in Figures 28 and 29 is provided with a switch 551 which is actuated by the lever 553 similar to 549.

The two other hand-operated cyclometers 556 and 558 are actuated by levers 555 and 557 respectively and operate a slide bar 559 which is supported on pins 561 set in the cyclometer case 563. The bar has hooked ends 565 and 567 which are actuated by pins 569, 571 fixed in the levers. The slide bar has a switch contact 573 which engages a contact 575 when the bar is actuated. The slide is returned to switch open position by a spring 577.

Figure 31:
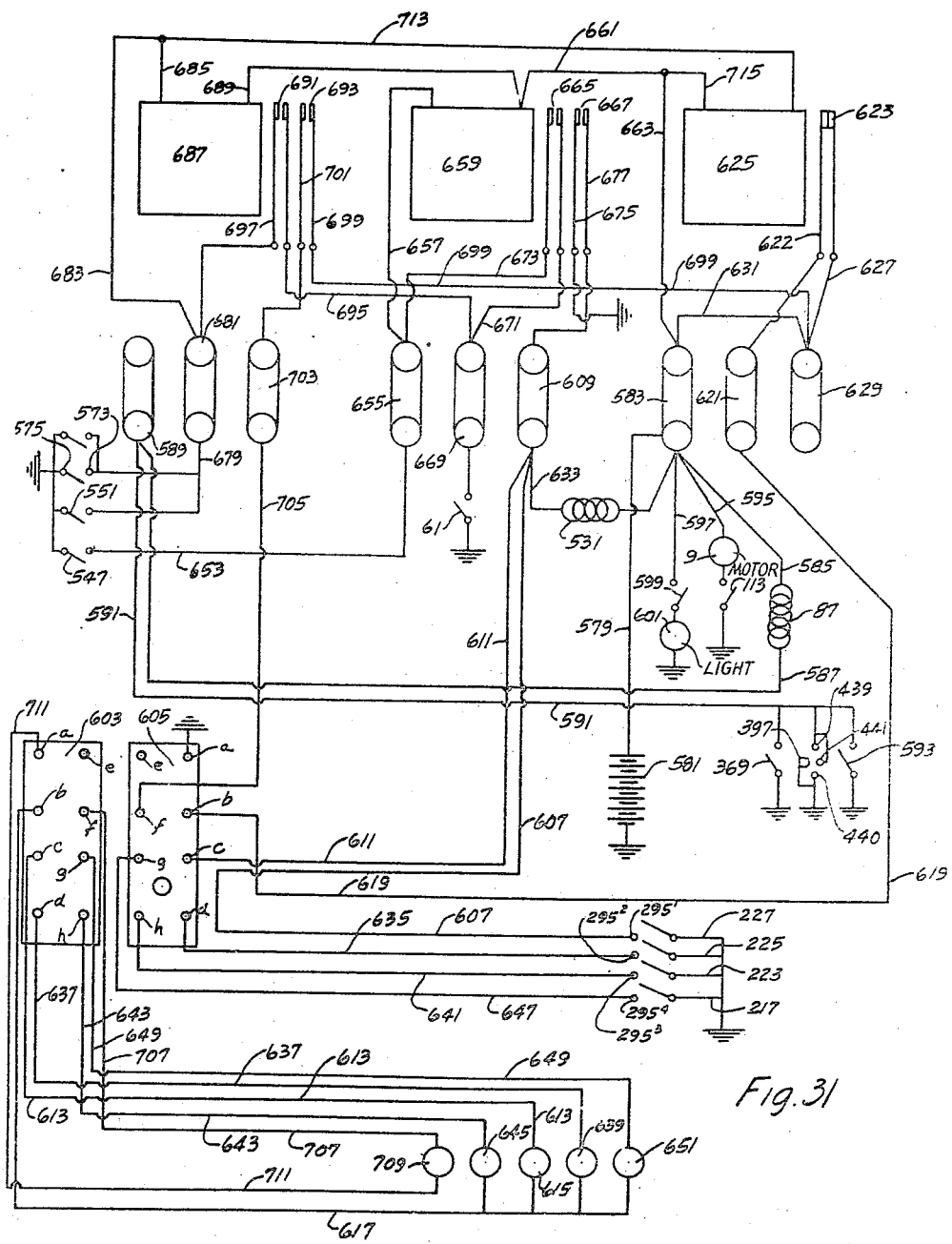

Wiring diagram (Fig. 31)

A circuit A is established through the line 579 which connects the battery 581 with a binding post 583, and a line 585 connects this post with the stop lever control magnet 87 which, in turn, is connected by a line 587 to a post 589, a line 591 and thence by any one of three parallel lines to ground.

One line is formed by the contacts 439, 440 and/or 397, 441 with the inserted check closing the gap between them. In case the machine is in the second or succeeding cycles in the repeat operation, the repeat ring switch 369 will control. The third control is the clearing switch 593 which is manually operable at will to clear the machine of checks which may be held in it or for purposes of inspection, etc.

Since the switch 113 is closed by the operation of the shaft 73 which is actuated by the magnet 87, a second circuit B is established from battery through line 579, post 583, line 595, motor 9, switch 113 to ground and the motor is energized.

A lighting circuit C is formed from battery through line 579, post 583, line 597, manual switch 599, light 601 to ground. The light is disposed at the head of the column 3 (Figs. 2 to 5) to light the check inspection shelves.

Numerals 603 and 605 represent the two portions of a separable multiple prong connector in which the pins having the same letter are normally connected.

When a check having a diameter of .900 inch is inserted in the machine, the slide bar 227 is actuated and a child's fare register 266 is advanced one step by the tooth 265 on the bar. At the same time, the circuit D is set up when switch $295^1$ is closed to ground a line 607 to the bar. This line is connected with a binding post 609, and thence by a line 611 to connections c—c, line 613, to a lamp 615 which is provided with a sign bearing the legend "Child," thence through line 617, contacts b—b, line 619, binding post 621, through line 622, the contacts 623 of the normally closed relay 625, thence by line 627 to post 629, by way of line 631 to post 583 and line 579 to battery.

There is also a parallel branch circuit E leading from line 607 through post 609, line 633, the bell muffle solenoid 531 to post 583, line 579 to the battery. This circuit is closed under control of the slide bar 227 and its associated switch 295¹. The muffle provides an audible signal peculiar to a child's fare.

The slide bar 225 operates switch 295² which closes a circuit F from ground, bar 225, switch 295², line 635, contacts d—d, line 637, lamp 639, line 617, contacts b—b, line 619, post 621, line 622, contacts 623, line 627, post 629, line 631, post 583, line 579 to battery. This bar is actuated upon the insertion of a coin representing a one-half cash fare and the lamp 639 lights a sign bearing the legend "Cash" (not shown). At the time the fare is paid the operator, noting that the fare paid is by a child, will actuate the child fare manual cyclometer 548 and the switch 547 with the consequence that circuits I and J, described below, are energized and the lamp 615 is lighted to display the legend "Child" also. If the operator does not actuate the cyclometer, there will be no change in the legend, and his failure to do so will become apparent to the passengers and any inspector who may be aboard the vehicle.

A circuit G is established from ground through slide bar 223, switch 295³, line 641, contacts h—h, line 643, lamp 645, line 617, contacts b—b, line 619, post 621, line 622, contacts 623, line 627, post 629, line 631, post 583, line 579 to battery. The lamp 645 indicates the receipt of an .800 inch check which represents a special fare such as a school child fare and a sign, not shown, which is lighted by the lamp indicates the receipt of this fare by displaying the legend "Token."

A circuit H is established from ground through slide bar 217, switch 295⁴, line 647, contacts g—g, line 649, lamp 651, line 617, contacts b—b, line 619, post 621, line 622, contacts 623, line 627, post 629, line 631, post 583, line 579 to battery. The slide bar 217 is actuated upon the deposit of a .650 inch check or token which represents a full fare and a legend "Adult," not shown, which is lighted by lamp 651 indicates that this fare has been deposited.

When the switch 547 and its associated manual cyclometer 548 is actuated, a circuit I is closed from ground, through switch 547, line 653, post 655, line 657, the solenoid 659, lines 661, 663, post 583 and line 579 to battery.

Energization of the solenoid 659 closes the normally open contacts 665 and 667 and a holding circuit J for the solenoid is set up from ground through breaker 61, post 669, line 671, contacts 665, line 673, post 655, line 657, relay solenoid 659, lines 661, 663, post 583, line 579 to battery. Thus both sets of contacts are held closed even though the switch 547 breaks the circuit I so long as the breaker 61 remains closed.

The closing of contacts 667 sets up a circuit K from ground through line 675, contacts 667, line 677, post 609, line 633, the muffle solenoid 531, post 583, and line 579 to battery. Thus the muffle provides an audible signal peculiar to a child's fare. Upon the next cycle of the machine, the circuits J and K are broken by breaker 61.

Closure of the contacts 667 also sets up a circuit P from ground through line 675, contacts 667, line 677, post 609, line 611, contacts c—c, line 613, lamp 615, line 617, contacts b—b, line 619, post 621, line 622, contacts 623, line 627, post 629, line 631, post 583, line 579 to battery 581 and ground. Thus the lamp 615 which displays the legend "Child" will be lighted and held.

Upon closure of the switch 551 by operation of its associated hand-cyclometer 552 for passes, a circuit L is set up from ground through switch 551, line 679, post 681, lines 683, 685, relay solenoid 687, lines 689, 661, 663, post 583, line 579 to battery. Energization of the relay closes the normally open contacts 691 and 693.

As a result of the closing of contacts 691 a holding circuit M is set up through the relay solenoid 687, from ground through breaker 61, post 669, line 695, contacts 691, line 697, post 681, line 683, 685, solenoid 687, lines 689, 661, 663, post 583, line 579 to battery. Thus the solenoid circuit, once established, is held until a subsequent operation of the machine operates the breaker 61.

The closing of the contacts 693 establishes a circuit N from battery 581, through line 579, post 583, line 631, post 629, line 699, contacts 693, line 701, post 703, line 705, contacts f—f, line 707, lamp 709, line 711, contacts a—a to ground. The lamp lights a sign, not shown, bearing the legend "Pass." This indication is held until the holding circuit is broken by breaker 61 as explained above.

Since the switch 573—575 is connected in parallel with switch 551 between ground and post 681, the operation of this switch by either of its associated cyclometers will set up the circuits M and N as described above by means of circuit L. The visible indication is the same for registers 552, 556 and 558 since all represent non-revenue fares.

It should also be noted that as the circuit L is set up a circuit O is also established from ground through either switch 573—575 or 551, line 679, post 681, lines 683, 713, through the winding of relay 625, lines 715, 663, post 583, line 579 to battery. The energization of relay 625 is maintained by the holding circuit M for relay 687 so long as the breaker 61 is held closed.

The energization of this relay 625 causes the normally closed contacts 623 to be opened, thus clearing any of the circuits D, F, G and H; previously established by a machine operation.

*Operation*

The machine disclosed herein for purposes of illustration is designed to be actuated upon the deposit of any one of seven checks—penny, nickel, dime, quarter, .650 token, .800 token, .900 token—and upon actuation to accumulate the fare upon a suitable register and to actuate either a bell or a visible indicator or both as the case may be.

In order to more completely illustrate the operation of the machine in response to the deposit of a check, the table on the next page lists these functions.

It should be noted that the basic fare is a nickel, and although the nickel is only a cash half fare, the machine operation is based on it. Since two nickels constitute a cash full fare, it is necessary that the machine upon deposit of a nickel, register it as a cash fare. To account for the nickels received as cash half fares, the operator is required to actuate the manual "child" cyclometer upon receipt of such a fare. This is the only occasion upon which the machine and hand cyclometers are used together to indicate the nature of the fare deposited.

The penny is made to register as a dime, which is an adult cash fare, to prevent loss of revenue by substitution, placing responsibility on operator of vehicle to see that a penny is not accepted instead of a dime. If no provision were made for registering a penny, acceptance of a penny as a fare would simply be to the operator's advantage since he could pocket this coin.

cuit A is closed through solenoid 87 to energize it.

The magnet lifts the locking lever 53 and the clutch disengaging lever 43, to permit engagement of the clutch and rotation of the same to

| Fare deposited | Parts actuated | | | | | Machine cycles | Type fare | Lamp legend |
|---|---|---|---|---|---|---|---|---|
| | Slide bar | Cyclometer | Circuit | Light | Bell | | | |
| Cyclometers: | | | | | | | | |
| Machine operated— | | | | | | | | |
| Non-clearing | 215 | None | None | None | Blocked | One | None | None. |
| .650 check | 217 | 250 | H | 651 | Two | Two | Full | Adult. |
| Nickel | 225 | 226 | F | 639 | One | One | Cash half | Cash. |
| Dime | 219; 225 | 226 | F | 639 | Two | Two | Cash full | Do. |
| Quarter | 229; 225 | 226 | F | 639 | Five | Five | Five half | Do. |
| .900 check | 227 | 266 | D | 615 | Muffled one | One | Child | Child. |
| .800 check | 223 | 260 | G | 645 | One | do | Special | Token. |
| Penny | 221; 225 | 226 | F | 639 | Two | Two | None | Cash. |
| Manual— | | | | | | | | |
| Pass | Lever | 552 | L, M, N | 709 | None | None | Full | Pass. |
| Child | do | 548 | I, P, J, K | 615 | do | do | Half | Child. |
| Ticket | do | 556 | L, M, N | | do | do | Full | Pass. |
| Transfer | do | 558 | L, M, N | | do | do | do | Do. |
| Dual: Nickel | {225 | 226 | F | 639 | One | One | Cash-half | Cash |
| | {Lever | 548 | P | 615 | None | None | | Child. |

In case the basic full fare is a nickel, the penny is usually, though not necessarily, caused to register and indicate as a nickel.

However, if the adult fare is a dime and a penny is inserted instead of a dime, the operator can check the improper payment by looking at the check displayed on the upper shelf. If he fails to do this he must make up the difference of nine cents.

Since the checks must be inserted singly in the machine, it is obvious that the checks will be registered in the order of their insertion.

Assuming that a nickel is deposited, this check will drop down the check chute and come to rest upon the long contacts 439 and 443. Since the check is of current conducting material, the circuit A is closed through solenoid 87 to energize it.

drive the other mechanisms. Rocking of the shaft 73 by the solenoid closes switch 113 and closes circuit B to start the motor to drive the clutch. At the beginning of the cycle of rotation of shaft 23 which occurs as soon as the clutch 27—33 becomes engaged, the parts occupy positions in which the center portion of the sector 123 contacts the center portion of the recess 121 and pin 493 is at its lowest point.

The table on pages 31 and 32 lists the various events approximately as they occur during a 360-degree cycle of shaft 23. It is, of course, obvious that the times of occurrence and duration of many of the events may be varied within reasonable limits and that the timing set forth in the table is merely illustrative.

*Table of timing of events in a cycle*

| Deg. rot. shaft 23 | Switch cam 57 | Bell cam 55 | Pitman cam 65 | Aligner cam 67 | Cam 121, pin 125 | Seg. 71, pin 493 | Shelf 519 | Shelf 518 |
|---|---|---|---|---|---|---|---|---|
| 0 | Rest | Clear | Rest | Rest | Locked—idle | Start idle take up | Idle | Idle. |
| 15 | End rest descend | Contact start rise. | do | do | do | Continue | do | Do. |
| 30 | Descent switch opens. | Rise | do | do | do | End take up box start. | do | Do. |
| 45 | do | do | do | do | Unlocked—start | Pickup pawl in; contacts start out. | do | Start down. |
| 60 | Complete descent. | do | do | do | Bar returned by detent. | Box, check, contacts continue. | do | Drop. |
| 72.5 | Clear | End rise | do | do | Pin continues | do | do | Do. |
| 82.5 | do | Upper rest | do | do | Full bar return position. | do | do | Spring return. |
| 120 | do | do | do | do | Continues | do | Start descent. | Idle. |
| 135 | do | do | do | do | Completes 180° | do | Descent | Do. |
| 145 | do | do | End rest descend. | do | Idle—locked | do | do | Do. |
| 170 | do | do | Descent | End rest start rise. | do | do | do | Do. |
| 192.5 | do | do | Complete descent. | Rise | do | do | do | Do. |
| 205 | do | do | Rest | do | do | End stroke | End stroke | Do. |
| 225 | do | do | do | do | Unlocked—end idle. | Reverse stroke | Reverse | Do. |
| 230 | do | do | do | End rise | Pin moves, bar moves. | do | do | Do. |
| 275 | do | do | do | Rest | Maximum stroke | do | do | Do. |
| 280 | do | do | do | End rest descend. | Move toward start position. | do | Reset | Do. |
| 300 | End clear start rise. | End rest bell | do | Descent | do | do | Idle | Do. |
| 312.5 | Rise | Clear | End rest start rise. | do | do | do | do | Do. |
| 315 | do | do | Rise | do | Full return 360° | do | do | Do. |
| 323 | do | do | do | do | Locked—idle | Pickup pawl starts out, contacts in—check released. | do | Do. |
| 333 | Switch closes | do | do | do | do | Box returned | do | Do. |
| 340 | Rise | do | do | End descent | do | Lost motion | do | Do. |
| 345 | Complete rise | do | do | Rest | do | do | do | Do. |
| 360 | Rest | do | End rise rest | do | do | End lost motion | do | Do. |

The table shows that during the first 15-degree rotation of the shaft, the switch 61 is held closed and the bell hammer lever 95 is engaged by cam 55.

During the next 15 degrees the switch is opened and the bell hammer is partially cocked. The pin 493 has also moved relative to lever 487 far enough to cause the lever 497 to be rotated far enough to take up all of the lost motion so that any further movement of shaft 23 and lever 487 will cause movement of the check box and its associated parts.

By the end of the next 15 degrees of rotation, the bell hammer has been further rotated and the check box has been lowered far enough to permit the pick-up pawls 410, 412 and finger 407 to enter the slots 413 and 416 respectively in the check chute. Also, at the end of this motion one locking element 123 will have moved far enough to unlock the corresponding locking indentation 121 and the advancing tooth of a gear sector 70 will engage the broad tooth 119 which is in position. The shelf 518 starts to descend.

During the next 15 degrees the switch cam 57 reaches its lowest rest level although under usual circumstances the switch 61 will have already opened as described above. At the end of this period also, the pin 125, which was actuated by the gear 115 by reason of the engagement of tooth 119 of said gear by the advancing tooth of gear sector 70 as described in the preceding paragraph, will have moved lever 129, link 135 and restoring bail 137 and roll 144 far enough that the detent roll 277 under the action of spring 273, and acting on the upper edge of notch 237, will cause the actuated slide bar which was set up in the preceding cycle to snap to its lowermost position. This breaks any lighting circuit which may have been held by the bar.

During this time, the check is being forced downward toward the measuring station and the bell hammer continues to rise.

At the end of the next 12½ degrees, the bell hammer is fully raised and is held in position by the rest portion of bell cam 55. The pin 125 continues to move and causes lever 143 to follow the slide bar. The check box also continues its motion.

At the end of the next ten degrees the pin 125 will attain a position in which a line through the center of stud 114 and pin 125 is perpendicular to the center line of lever 129 and the restoring lever 143 will have attained its extreme downward position. Shelf 518 snaps back to normal.

At the end of the next 37½ degree movement, the shelf 519 starts to descend to dump the check onto shelf 518.

By the end of the next 15 degree rotation of the shaft, the pin 125 will have rotated 105 degrees to complete a half revolution which positions the lever 143 in its initial position half way between its extreme positions. The second locking element 123 is now about to move into locking position with the second recess 121 in sector 117. The last teeth of gear sectors 118 and 70 disengage and pin 125 and its associated parts come to rest. It will be seen that the ratio of sectors 70 to 118 is 2 to 1 so that in accomplishing 180 degrees rotation of pin 125, shaft 23 has moved only 90 degrees.

At the end of the next 10 degrees, the roller 163 on lever 157—161 which controls the pitman 162 completes its contact with the upper rest surface of the pitman cam 65 and during the succeeding period descends the cam under the action of spring 171 which operates on pin 175 set in the pitman (Fig. 8).

At the completion of an additional 25 degree rotation the aligner cam 67 which has had its rest portion in contact with roll 195 comes to the end of the rest period and during the ensuing rotation causes the roll to rotate lever 191 in a counter-clockwise direction (Fig. 8) so as to eventually position the positioning pawl 189 in contact with a sector tooth 187.

By the end of the next 22½ degrees of rotation the pitman cam 65 will have completed its rotation through its falling contour. The motion of the pitman will have been transmitted through link 181 to the sector 179 and through pin 182 carried by the sector to the lever 153 (Figs. 1, 2, 3, 4, 5 and 13).

If the machine had been caused to operate by closure of the "clearing switch" 593, the roll 163 will follow the contour of the cam and the lever 153 will be positioned in alignment with slide bar 215. However, if a check is positioned in the measuring station by the check feeding mechanism, which has been in operation all this time, then the travel of the pitman will be stopped at a point intermediate the full forward and fully retracted positions, depending upon the diameter of the check, and the roll 163 will leave the cam at a corresponding point. The lever 153 will therefore be positioned in front of one of the other bars if the check is of a diameter adapted to be handled by the machine. Since we have assumed that the check inserted was a nickel, the lever will stop in alignment with bar 225.

At the end of the next 12½ degrees, the pin 493 which has been in operation continuously, assumes a position such that a radius through the centers of shaft 23 and pin 493 is perpendicular to the center line of lever 487. The check box therefore has attained its lowermost position. However, due to the fact that the anvil 169 and the end 167 of the pitman are relatively wide and the movement of the box in this zone is relatively small, the check is in the measuring station in time to be grasped between the pitman and anvil. Even if this were not true, the pitman, being spring pressed, could easily be moved in a reverse direction by the check which is positively actuated by the check feeder. Shelf 519 has completed its downward stroke by this time.

At the end of the next 20 degrees the cam 65 continues its ride. The active element 123 unlocks the associated recess 121 and the advancing tooth of sector 70 meets the broad tooth 119 of sector 115 and the pin 125 is about to move.

At the end of the next 5 degrees the aligner cam 67, which has been rising under its roller 195, completes its rise to force the positioning pawl 189 into full contact with the positioned tooth 187. This function is necessary to accurately align the lever 153 with the slide bar which is to be operated since checks become mutilated or worn and their diameters may not always be of the established size. The check measuring mechanism cannot be expected to position the lever accurately. This positioning of the lever insures positive registration since the clearance between the slide bars is such that if this precaution were not taken, lever 153 might enter the space between the bars. Just after this event, the pin 125 moves the lever 153 counter-clockwise (Fig. 1) toward and into engagement with the selected slide bar.

At the end of the next 45 degree movement, the pin 125 gives the maximum movement to lever 153 and the bar 225 arrives at its uppermost position so that the detent roll 275 urged by spring 273, engages the upper notch 239 and holds the bar in the fully actuated position.

As the bar 225 rises, it closes its circuit control switch 295² to energize circuit F and lamp 639.

The end of the next 5 degree rotation finds the aligner cam at the end of its upper rest period. Pin 125 and lever 153 continue toward their starting positions as does the check box. Shelf 519 is reset.

At the end of the next 20 degrees, the switch cam 57 ends its clear period and the aligner cam 67 continues its descent, moving the positioning pawl out of contact with its associated sector tooth.

If no check is in the machine, bar 215 will have been raised and in this case the pin 545 on the bar (Fig. 13) actuates the lever 541 to position the stop 537 (Fig. 11) in front of the hammer so that no audible signal will be given. The block will be held until the bar 115 is returned and since this occurs after the bell cam 55 is actuated to a partial "rise" position, there will be no signal after the beginning of the next cycle as a result of the preceding cycle.

At the end of the next 12.5 degrees, the pitman cam completes its rest period. After this period the cam will either start to retract the pitman, if no check was in the machine, or move toward the roll 163 to pick it up, if a check was in the machine.

At the end of the next 2½ degrees, the pin 125 and lever 153 complete their entire stroke and the projection 123 is again in position to lock the recess 121 and the gears are disengaged.

Since the ratio of gears 70 to 118 is 2 to 1, it will be seen that only 180 degrees of rotation of shaft 23 results in a full 360 degree rotation of the pin 125.

About 8 degrees later, the pick-up pawls 410—412, finger 407 and, slightly thereafter, end 471 of plate 467 are withdrawn from the check chute and the check is released so that it may fall into the check receptacle and onto the upper shelf 519. The other elements in the check chute are also withdrawn and the contacts 440—441 are returned.

If the check in the machine is one which requires a plurality of cycles of the machine, the stop lever 325 will contact the stop 324 on the check box and prevent it from rising to the releasing point just described. The lever 487 is permitted to complete its stroke, in spite of the fact that the check box is stopped in an intermediate position, by reason of the rotation of bell crank 497 about pin 495 against the action of the spring 500. The bell crank and spring constitute a "lost motion" device. The stop lever is, of course, set by the repeat mechanism which is actuated by the movement of the slide bar to its fullest extent. In the case assumed, there is no such stoppage of the box because a nickel fare requires only one actuation of the machine.

At the end of the next 10 degree rotation of shaft 23 the check box is fully returned to its initial position. During this period the switch 61 is closed. The time of closing varies with the adjustment of the reciprocating contact 59 (Fig. 12).

At the end of the next 7 degrees the aligner cam completes its descent and the roll 195 and pawl 189 come to rest. The lost motion lever 417 moves to permit relative movement between lever 487 and the check box.

At the end of the next 5 degrees the switch contact 59 reaches the highest contour of cam 57 and during the final 15 degrees the pitman roll 163 reaches the highest part of cam 65. The pitman is fully withdrawn and the cam lever 43 (Fig. 9) at this point retracts the pin 33 to declutch the motor from shaft 23. At the same time, the control lever 53 drops into the notch 51 and shaft 73 rotates counter-clockwise (Figs. 10 and 12) to open the switch 113 and stop the motor. This completes the cycle.

In the event any check is inserted which requires two rings, one of the bars 217, 219 or 221 will be raised. The nose 231 of the bar will contact the carrier 335 and the pawl 345 will advance ratchets 347, 349 and 351 one-tenth of a revolution. This in turn causes ratchet 349 to cam pawl 358 out of a notch and rotate shaft 299 clockwise (Fig. 17), causing lever 367 to close switch 369 which closes a circuit parallel to those closed by the check in the gaps and starts another cycle.

Since the stop 325 prevents the check box from returning far enough to allow ejection of the check, the check will remain in the measuring station and the same slide bar will be actuated on the second cycle.

The second one-tenth revolution of ratchets 347, 349 and 351 will bring a deep notch in alignment with the pawl 358 and the pawl, shaft 299, switch 369 and stop 325 will be returned to the initial position to end the cycle and permit the return of the check box to eject the check.

If the check inserted is one which requires five rings, such as a quarter, the quarter slide bar 229 will be raised. The nose 231 of the bar will contact the button 333 and advance ratchet 307 one step, which is one-tenth of a revolution. The ratchets 311 and 309 are also advanced, the pawl 310 is cammed out of its notch, and the stop 325 of lever 321 is positioned in the path of the abutment 324 on the check box 393.

The ratchet 311 cams the pawl 327 out of the deep notch 313 and the projection 332 on lever 327 enters the groove 151 (Fig. 24) in the hub of the interponent lever 153. This holds the lever 153 in position before the slide bar 229 so that in case the check is accidentally discharged, the five cycles will be completed.

Upon succeeding strokes of the slide bar, the ratchets will be advanced step by step until the pawl 327 again enters a deep notch 313 and is returned to the initial position with the result that the operation of the machine in response to the insertion of the check is completed.

The register actuated by the slide bar and the bell will have been actuated the required number of times and the signal corresponding to the register operated is energized. The signal is held until a subsequent operation of either a machine or hand cyclometer.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a check registering machine, the combination of a plurality of registers, a cycling control device, power means normally operable through a cycle, a plurality of movable elements each adapted to actuate a register and certain of said elements being adapted to actuate the control device to cause predetermined, additional cycling of said power means, a check measuring means, said measuring means being constructed and arranged to connect said power means with the movable element corresponding to the check measured.

2. In a check registering machine, the combination of a plurality of registers, a cycling control device, power means normally operable through a cycle, a plurality of movable elements each adapted to actuate a register and some being adapted to actuate the control device to predetermine the number of cycles to be made by the power means, a check measuring means adapted to receive checks, said measuring means being constructed and arranged to connect said power means with the movable element corresponding to the check measured, registering means connected for actuation by said movable element, and means actuated by said control device for causing the predetermined, repeated cycling operations of said machine corresponding to the multiple fare check.

3. In a check registering and signalling machine, the combination of a plurality of registers, a cycling control device, power means normally operable through a cycle, a plurality of movable elements each of which is adapted to actuate a register and some of which are adapted to actuate the control device to cause predetermined, additional cycles of said power means, a check measuring means, said measuring means being constructed and arranged to connect said power means with the movable element corresponding to the check measured, and signalling means adapted to be actuated by said movable elements for indicating the fare represented by the check.

4. In a check registering and signalling machine, the combination of a plurality of registers, a cycling control device, power means normally operable through a cycle, a plurality of movable elements each of which is adapted to actuate a register and some of which are adapted to actuate the control device to cause predetermined, repeated cycling of the power means, a check measuring means, said measuring means being constructed and arranged to connect said power means with the movable element corresponding to the check measured, and audible signal means adapted to be actuated by said power mechanism, once for each cycle of said machine.

5. In a check registering machine, the combination of a plurality of registers, a cycling control device, power means normally operable through one cycle, a plurality of movable elements each arranged in predetermined position and adapted to actuate a register, certain of said elements being also adapted to actuate the control device to cause predetermined, additional cycles of said power means, a check measuring means, said means comprising an interponent and means for positioning said interponent, in accordance with the size of the check measured, between the power means and the movable element occupying the position corresponding to the fare accepted.

6. In a check registering machine, the combination of a plurality of registers, a control device for causing a plurality of machine cycles, a plurality of movable elements each adapted to actuate a register and some to actuate the control device, a power device and check controlled means for selecting an element and connecting it for operation by said power device, means for handling a check, including means actuated by said power device for positioning said check for measuring and for releasably holding said check, said handling means having a check ejecting position in which said holding means is released and an intermediate position in which the holding means is retained in holding position, retaining means having active and inactive positions and connected for movement by said control device into active position for retaining said handling means in the intermediate position upon receipt of a multiple fare check, said control device serving to restore said retaining means to inactive position upon completion of the cycling of the machine.

7. In a check registering machine, check handling means, check measuring means, said check handling means having initial, intermediate and actuated positions, and including check holding means which are effective, in the intermediate and actuated positions, to hold a check in position adjacent the measuring means, a cycle repeating mechanism, means connecting said measuring means to control said repeating mechanism, a stop, having active and inactive positions and connected for operation between said positions by said repeating mechanism and, in active position, adapted to stop said check handling means in said intermediate position, power means normally operable through one cycle for actuating said check handling means from initial to actuated position, for actuating said check measuring means and for thereafter returning said check handling means to initial position, said power means comprising a motor and a yieldable means connecting said motor with said check handling means, whereby said power means may complete a cycle while the check handling means is held in intermediate position by said stop.

8. In a fare registering mechanism, the combination of check measuring means comprising fixed and movable elements, a plurality of control elements, a selector connected for movement with said movable element and adapted to be positioned thereby in approximate alignment with the control element corresponding to the measured check, and additional aligning means for thereafter more exactly aligning said selector with the selected control element, comprising a plurality of stops connected to move said selector, a movable positioning member, and means for moving said positioning member into contact with a stop and for thereafter moving said member and said stop to a single predetermined position.

9. In a fare registering mechanism, the combination of check measuring means comprising fixed and movable elements, a plurality of control elements, a selector connected for movement with said movable element and adapted to be positioned thereby in approximate alignment with the control element corresponding to the measured check, a movable positioning member, an aligning sector, having a plurality of stops, movably connected with the selector and adapted to be positioned by said check measuring means with a stop, corresponding to the check measured, in position to be engaged by said member, and means for moving said member into engagement with the stop and for thereafter moving said stop to a single predetermined position to accurately position said sector and said selector.

10. In a fare registering mechanism, the combination of a check chute, a pair of contacts disposed therein to receive a check, check handling means, including a check pick-up pawl, supported adjacent said chute for movement into and thereafter lengthwise of said chute, to engage the check and to feed it past said contacts, power means energized upon the deposit of a check on said contacts, for actuating and returning said handling means, means mounting said contacts for movement into and out of the path of said check, connections between said means mounting said contacts and said power means for moving them, and means operable with said pawl for gripping said check prior to the release thereof by the contacts, a stop on said check handling means, and a settable stop engaging means adapted to arrest the return of said handling means just prior to withdrawal of said pawl from said chute to prevent said gripping means from disengaging said check.

11. In a fare registering mechanism, the combination of a measuring device, a check chute, a pair of contacts disposed therein to receive a check, check handling means, comprising a check pick-up pawl, normally supported adjacent said chute for movement thereinto to entered position and therealong to engage the check and feed it past the contacts, a check holding finger connected to be operated upon operation of said pawl and adapted to engage said check as the pawl enters the chute, cycle control means, conditioned by said measuring means, for preventing retraction of said pawl beyond the entered position and to prevent said check holding finger from disengaging said check, and power means under control of a circuit formed by said check and said contacts for actuating said pawl and finger.

12. In a check registering machine, the combination of check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, and means connected with said motor for actuating said selector, the selected register actuating element and its associated register.

13. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, and means operated by certain of said actuating elements for closing said repeat switch and for reopening it after the completion of a predetermined number of register operating cycles of said machine.

14. In a check registering mechanism, the combination of a check measuring mechanism, a cycling control device and a plurality of registers, a plurality of actuators for operating said registers and said cyling control device, means mounting said activators for movement between initial and actuated positions, means for holding said actuators in one or the other of said positions, said measuring means being adapted to select an actuator corresponding to the check measured, means for thereafter moving the selected actuator to actuated position, means operable to reset said actuator to initial position prior to another operation of said check measuring means, said cycling control device, upon operation by certain of said actuators, being constructed and arranged to cause a repeat operation of said registered mechanism.

15. In a check registering mechanism, the combination of a check measuring mechanism, a plurality of registers, register actuators comprising a series of selectable elements adapted for displacement between active and initial positions, a selector and operator under control of said measuring mechanism adapted to select the element corresponding to the check measured, means adapted to displace said selected element to active position to actuate said register, a signal energized by said element upon displacement thereof, means for holding said element in displaced position, and resetting means for restoring said element to initial position.

16. In a check registering mechanism, the combination of a check measuring mechanism, a cycling control device and a plurality of registers, a plurality of actuators for operating said registers and said cyling control device, means mounting said actuators for movement between initial and actuated positions, means for holding said actuators in one or the other of said positions, said measuring means being adapted to select an actuator corresponding to the check measured, means for moving said selected actuator to actuated position, means operable to reset said actuator prior to another operation of said check measuring means, power means, and connecting and timing means between said power means and said measuring, displacing and resetting means for first resetting a moved actuator to initial position, and thereafter selecting and moving an actuator to actuated position, said cycling control device, in response to operation by certain of said actuators, being constructed and arranged to prevent release of the actuating check and to cause a repeat operation of said registering mechanism.

17. In a fare registering mechanism, the combination of a check receiver, a check measuring mechanism comprising a gage bar adapted to be moved toward and to yieldably engage said check, the amount of movement being determined by the size of the check, a plurality of registers, a plurality of displaceable register actuating elements having a normal and an actuated position, means for holding said elements in actuated position, signalling means, means operable by said members when they are in actuated position for energizing and holding energized the associated signalling means, an interponent mounted for selective movement to engaging position with any of said elements, means connecting said interponent with said measuring mechanism to transmit said selecting movement to said interponent to position it in engaging position with the element corresponding to the check measured, means for setting any displaced actuating elements to normal position, and means for moving said interponent to actuate said element to actuated position.

18. In a fare registering mechanism, the combination of a check handling means adapted to position a check for measuring, a check measuring mechanism comprising a pitman adapted to be moved toward and to yieldably engage said positioned check, the amount of movement of said pitman being determined by the size of the check, a plurality of registers, a plurality of displaceable register actuating elements, an interponent mounted for selective movement to engaging position with any of said register actuating elements, means connecting said interponent with said pitman to transmit said selecting movement to said interponent to position it in engaging position with the register actuating element corresponding to the check measured, means for moving said interponent to actuate said selected element, and means, adapted for operation after the interponent is positioned by said pitman, for accurately positioning said interponent with respect to the selected element, said positioning means comprising a movable element having a predetermined actuated position, power means for moving said element to said actuated position, a stop member having a plurality of two-sided stops, connected to move said interponent, said pitman being connected to position the stop corresponding to the diameter of the check being measured adjacent said predetermined position, and means on said movable element adapted to engage both sides of the positioned stop to move it with said movable element to said predetermined position and to lock it in said position.

19. In a fare registering mechanism, the combination of a check receiver, a check measuring mechanism comprising an element adapted to be moved toward and to yieldably engage said check, the amount of movement being determined by the size of the check, a plurality of displaceable register actuating elements, an interponent mounted for selective movement to engaging position with any of said elements, means connecting said interponent with said measuring mechanism to transmit said selecting movement to said interponent to position it in engaging position with the element corresponding to the check measured, means for moving said interponent to actuate said element, a sector mounted for movement with said measuring means having stationing abutments corresponding to the stations of said interponent, and a positioning element connected for operation to engage a stationing abutment positioned by said measuring means and to lock said interponent in adjusted position prior to actuation thereof.

20. In a cycling fare registering mechanism, power means, check receiving means, a plurality of registers, register selecting means comprising an element movable by said power means to a position corresponding to the check received, means operable by said element to actuate a selected register, a cycle repeating mechanism actuated by said latter means for causing a predetermined number of actuations of said selected register, and means actuated by said repeating mechanism for holding said element in said corresponding position until the required number of actuations have been completed.

21. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, means operated by one of said actuating elements for closing said repeat switch and for reopening it after a predetermined number of register operating cycles of said machine, said repeat switch closing means comprising a ratchet, means adapted to be actuated by an element for advancing said ratchet a predetermined distance for each actuation, a pawl cooperating with said ratchet, connected with said repeat switch and adapted to be moved to switch closing position upon the first movement of said ratchet advancing means, and means to restore said pawl to switch opening position after a predetermined number of advances of said ratchet.

22. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, means operated by certain of said actuating elements for closing said repeat switch and for reopening it after a predetermined number of register operating cycles of said machine, said check handling means comprising releasable check holding means for retaining a deposited check at the measuring station, and means actuated by said repeat switch closing means for preventing the release of said check by said holding means.

23. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, means operated by certain of said actuating elements for closing said repeat switch and for reopening it after a predetermined number of register operating cycles of said machine, said repeat switch operating means comprising a five-tooth ratchet, means actuated by an element for advancing said ratchet half the distance between the teeth for each actuation of the element a pawl adapted to be displaced from said ratchet by a tooth upon the first advance and to return to the ratchet upon the next advance, and means connecting said repeat switch with said pawl, said connecting means being adapted to close the repeat switch upon displacement of the pawl and to open said switch upon the return of the pawl.

24. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, means operated by certain of said actuating elements for closing said switch and for reopening said repeat switch after a predetermined number of register operating cycles of said machine, said repeat switch closing means comprising a five-tooth ratchet, means actuated by an element for advancing said ratchet half the distance between the teeth for each actuation of the element, a pawl adapted to be displaced from said ratchet by a tooth upon the first advance and to return to the ratchet upon the next advance, means connecting said repeat switch with said pawl, said connecting means being adapted to close the repeat switch upon displacement of the pawl and to open said switch upon the return of the pawl, a two-tooth ratchet, means actuated by a second element to advance said two-tooth ratchet one-fifth of a tooth length for each actuation of said second element, a pawl connected to be displaced by a tooth of said two-tooth ratchet upon the first advance and to be returned upon the fifth advance, and means connecting said pawl to close said switch upon displacement and to open said switch upon return of said pawl.

25. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to said motor circuit, means operated by one of said actuating elements for closing said repeat switch and for reopening it after a predetermined number of register operating cycles of said machine, said repeat switch closing means comprising a five-tooth ratchet means actuated by an element for advancing said ratchet half the distance between the teeth for each actuation of the element, a pawl adapted to be displaced from said ratchet by a tooth upon the first advance and to return to the ratchet upon the next advance, means connecting said repeat switch with said pawl, said connecting means being adapted to close the repeat switch upon displacement of the pawl and to open said switch upon the return of the pawl, said check handling means comprising releasable check holding means for retaining a deposited check at the measuring station, and means actuated by said repeat switch closing means for preventing the operation of said check holding means to release said check until the pawl is returned.

26. In a check registering machine, the combination of a check handling means adapted to position a check at a measuring station, a motor, means comprising a circuit adapted to energize said motor upon the deposit of a check in the check handling means, means, including a switch, driven by the motor for holding said motor energized for one register operating cycle of said machine and for thereafter deenergizing said motor, means at the measuring station, actuated by the motor, for measuring said check, a plurality of register actuating elements, a plurality of registers associated with said elements, a selector connected for operation by said measuring means and adapted to be positioned thereby in actuating relation with the actuating element corresponding to the check measured, means connected with said motor for actuating said selector, the selected register actuating element and its associated register, a repeat switch connected to close said motor circuit, means operated by certain of said actuating elements for closing said repeat switch and for reopening it after a predetermined number of register operating cycles of said machine, said repeat switch closing means comprising a five-tooth ratchet means actuated by an element for advancing said ratchet half the distance between the teeth for each actuation of the element, a pawl adapted to be displaced from said ratchet by a tooth upon the first advance and to return to the ratchet upon the next advance, means connecting said repeat switch with said pawl, said connecting means being adapted to close the repeat switch upon displacement of the pawl and to open said switch upon the return of the pawl, a two-tooth ratchet, means actuated by a second element to advance said two-tooth ratchet one-fifth of a tooth length for each actuation of said second element, a pawl connected to be displaced by a ratchet tooth upon the first advance and to be returned upon the fifth advance, means connecting said pawl to close said switch upon displacement and to open said switch upon return of said pawl, said check handling means comprising releasable check holding means for retaining a deposited check at the measuring station, and means actuated by said repeat switch closing means for preventing the release of said holding means until the actuated pawl is returned to its ratchet.

ERNEST H. THOMPSON.